United States Patent
Stewart et al.

(10) Patent No.: US 7,272,691 B2
(45) Date of Patent: Sep. 18, 2007

(54) INTERCONNECT SWITCH ASSEMBLY WITH INPUT AND OUTPUT PORTS SWITCH COUPLING TO PROCESSOR OR MEMORY PAIR AND TO NEIGHBOR PORTS COUPLING TO ADJACENT PAIRS SWITCH ASSEMBLIES

(75) Inventors: Malcolm Stewart, Nepean (CA); Eric Giernalcyzk, Ottawa (CA); Richard Beriault, Hull (CA)

(73) Assignee: Mtekvision Co., Ltd., Seoul (KR)

( * ) Notice: Subject to any disclaimer, the term of this patent is extended or adjusted under 35 U.S.C. 154(b) by 0 days.

(21) Appl. No.: 11/623,786

(22) Filed: Jan. 17, 2007

(65) Prior Publication Data
US 2007/0118721 A1   May 24, 2007

Related U.S. Application Data

(62) Division of application No. 10/469,525, filed as application No. PCT/CA02/00299 on Mar. 4, 2002, now Pat. No. 7,185,174.

(60) Provisional application No. 60/272,301, filed on Mar. 2, 2001.

(51) Int. Cl.
*G06F 12/00* (2006.01)

(52) U.S. Cl. .......................... 711/148; 712/14
(58) Field of Classification Search ...................... None
See application file for complete search history.

(56) References Cited
U.S. PATENT DOCUMENTS

| 5,048,108 | A | | 9/1991 | Basille et al. |
| 5,056,000 | A | | 10/1991 | Chang |
| 5,058,053 | A | * | 10/1991 | Gillett ........................ 710/317 |
| 5,084,836 | A | * | 1/1992 | Yamaguchi ................ 712/29 |
| 5,235,575 | A | | 8/1993 | Han |
| 5,465,375 | A | * | 11/1995 | Thepaut et al. ............... 712/15 |
| 5,546,343 | A | | 8/1996 | Elliott et al. |
| 5,590,356 | A | | 12/1996 | Gilbert |
| 5,878,241 | A | | 3/1999 | Wilkinson et al. |
| 5,937,202 | A | | 8/1999 | Crosetto |
| 5,956,274 | A | | 9/1999 | Elliott et al. |

(Continued)

FOREIGN PATENT DOCUMENTS

WO    WO 00/62182    10/2000

*Primary Examiner*—Kenneth S. Kim
(74) *Attorney, Agent, or Firm*—Blackwell Sanders LLP; Changhoon Lee

(57) ABSTRACT

A data processor apparatus comprises a plurality of processor elements, a memory having a plurality of parts, and a first switching element associated with the first processor element for switchably coupling the first processor element to its associated memory part for at least one of read and write access. The first switching element has an input port, an output port, a first port being coupled to a second switching element, the second switching element being associated with the second processor element for switchably coupling the second processor element to its associated memory part, a second port being coupled to a third switching element, the third switching element being associated with the third processor element for switchably coupling the third processor element to its associated memory part, a first switch means for selectively coupling the first port to one of the input port and the output port, and a second switch means for selectively coupling the second port to one of the input port and the output port.

4 Claims, 18 Drawing Sheets

U.S. PATENT DOCUMENTS 6,266,760 B1    7/2001   DeHon et al.
6,681,316 B1    1/2004   Clermidy et al.
6,779,128 B1 *   8/2004   Gale et al. ................. 714/6
2005/0076187 A1   4/2005   Claydon

* cited by examiner

TABLE 1

| INPUT | OUTPUT | |
|---|---|---|
| | EN=0 | EN=1 |
| 0 | TRI | 1 |
| 1 | TRI | 0 |

TABLE 2

| W-N | | N | | N-E | |
|---|---|---|---|---|---|
| S2 | 1 | S2 | 1 | S2 | 1 |
| S1 | 0 | S1 | 0 | S1 | 0 |
| S0 | 1 | S0 | 0 | S0 | 0 |
| UEN | 0 | UEN | 0 | UEN | 0 |
| REN | 1 | REN | 0 | REN | 0 |
| DEN | 0 | DEN | 0 | DEN | 1 |
| W | | BYPASS | | E | |
| S2 | 1 | S2 | 0 | S2 | 1 |
| S1 | 1 | S1 | X | S1 | 0 |
| S0 | 1 | S0 | X | S0 | 1 |
| UEN | 1 | UEN | X | UEN | 0 |
| REN | 1 | REN | X | REN | 0 |
| DEN | 1 | DEN | X | DEN | 1 |
| S-W | | S | | E-S | |
| S2 | 1 | S2 | 1 | S2 | 1 |
| S1 | 1 | S1 | 1 | S1 | 1 |
| S0 | 0 | S0 | 0 | S0 | 1 |
| UEN | 1 | UEN | 1 | UEN | 1 |
| REN | 1 | REN | 0 | REN | 0 |
| DEN | 1 | DEN | 0 | DEN | 0 |

US 7,272,691 B2

INTERCONNECT SWITCH ASSEMBLY WITH INPUT AND OUTPUT PORTS SWITCH COUPLING TO PROCESSOR OR MEMORY PAIR AND TO NEIGHBOR PORTS COUPLING TO ADJACENT PAIRS SWITCH ASSEMBLIES

CROSS REFERENCE TO RELATED APPLICATION

This Application is a Divisional Application of application Ser. No. 10/469,525 filed Feb. 23, 2004, now U.S. Pat. No. 7,185,174 now allowed, of the same title, which is based upon International Application PCT Application No. PCT/CA02/00299 filed Mar. 4, 2002. The disclosures of U.S. patent application Ser. No. 10/469,525 and International Application PCT Application No. PCT/CA02/00299 are incorporated herein by reference.

BACKGROUND OF INVENTION

The present invention relates to access control in a data processor, and in particular but not limited to access control in a single instruction multiple data (SIMD) processor.

A typical single-instruction-multiple-data (SIMD) processor has multiple processor units each having its own associated memory space. The processor units are simple processes unable to fetch or interpret instructions, and are controlled by a single control unit whereby the processor units act as slaves, performing at its request, arithmetic-logic operations. One advantage of this architecture is that more memory and processor units can be easily added to the computer.

An example of a SIMD processor is described in U.S. Pat. No. 5,956,274 ('274b patent) issued on 21.sup.st Sep. 1999 to Duncan G. Elliott, et al. In this architecture the processing units are placed within the memory, there being one processor unit per column of storage elements, each processor unit being directly coupled to the sense amplifier of each column, and whose output is coupled to the memory column decoder. Each processor element is a single bit processor element and is capable of processing serial data output from the memory column to which it is coupled and associated. The disclosed structure allows for higher bandwidth communications between the memory and processing elements, allowing for a much high processing throughput as processing is not limited by the ability to provide data to the individual processing elements.

There are however aspects to the disclosed architecture that hamper its ability to be widely implemented. First, the structure disclosed in the '274 patent implements a single row i.e. 1-D layout of processing elements. Second, processing elements are coupled to and associated with a single column of memory such that the processing elements in the '274 patent are only able to communicate with the column or columns of memory with which they are coupled and associated.

In applications such as the processing of image, including video, it is desirable to have a high bandwidth of data from the memory. It is further desirable to have access to numerous portions of memory, including those with which a given processing element is not associated. It is also advantageous to implement an array of processing elements i.e. a 2-D structure.

The tight integration of processing elements and memory as outlined in the '274 patent generally makes it difficult to provide for communications between a two dimensional array of processing elements. It is further difficult to provide for communications between a given processing element and the portions of memory with which it is not associated. A communication network that implements 1 to 1 communications links between a given processing element and all other processing elements and all portions of memory is not practical, even with multi-layer metallization technology as is found in current semiconductor processing. Therefore there is a need for a communications between processing elements and memory without requiring 1 to 1 links between elements and is implementable within a structure where processing elements are integrated in memory.

SUMMARY OF THE INVENTION

According to one aspect of the present invention, there is provided a data processor apparatus, comprising: a first processor element and a second processor element, a memory having a first part and a second part, the first processor element being coupleable to the first part for at least one of read and write access, the second processor element being coupleable to the second part for at least one of read and write access, and an access switch for selectively coupling the first processing element to one of the first part, for at least one of read and write access and the second part, for at least one of read and write access.

Advantageously, this arrangement enables a processor element to access a memory segment associated with another processor element without the need to involve the processor element associated with the other memory segment in the data transfer, which therefore allows the associated processor element to perform other functions, rather than spend time/cycles transferring data to another processor element from its memory segment. This arrangement not only provides any flexibility of enabling data transfers between different memory segments and a given processor element, but also significantly reduces the time required for the transfer, and in embodiments of the present invention, data transfers from non-local memory segments may be achieved in a single cycle.

According to another aspect of the present invention there is provided a data processor apparatus, comprising: a first processor element and a second processor element, a memory having a first part and a second part, said first processor element being coupleable to said first part for at least one of read and write access, said second processor element being coupleable to said second part for at least one of read and write access, and an access switch for selectively coupling said first processing element to one of said first part, for at least one of read and write access, and said second part, for at least one of read and write access.

According to another aspect of the present invention there is provided a data processor apparatus comprising a plurality of processor elements, a memory having a plurality of parts, each different part being coupleable to a different one of said plurality of processor elements, and switch means for switch/coupling at least one of said processor elements from its associated memory part to the memory part associated with at least one other processing element.

According to another aspect of the present invention there is provided a switching element for switchably coupling an array of circuit elements each having an input and an output, the switching element comprising: an input for coupling to the output of a circuit element, an output for coupling to an input of a circuit element, and first and second switch means, said first switch means having a first state in which said first port is coupled to said input port, and a second state in which said first port is coupled to said output port, and said second switch means having a first state in which said second port is coupled to said input port and a second state in which said second port is coupled to said output port.

According to another aspect of the present invention there is provided a data processor apparatus comprising a plurality of processor elements and a memory having a plurality of segments, each containing at least one column of storage elements, and each segment having a memory port, and wherein at least one memory port is coupled to at least two processor elements.

According to another aspect of the present inventions there is provided a data processor having a first memory block, a first array of processor elements, each processor element being capable of accessing said first memory block, a first array of switching elements each associated with a respective processor element of said first array, a second memory block and a second array of processor elements, each being capable of accessing said second memory block, a second array of switching elements each associated with a respective processor element of said second array, wherein a corresponding switching element of said first array is coupled to a corresponding switching element of said second array.

According to another aspect of the present invention, there is provided a data processor comprising an array of circuit elements and a switching element associated with each of said circuit elements said switching elements being interconnected to enable data to be transferred between said circuit elements.

BRIEF DESCRIPTION OF THE DRAWINGS

Examples of embodiments of the present invention will now be described with reference to the drawings, in which.

DESCRIPTION OF EMBODIMENTS

Embodiments of the current invention present aspects of a communications network that allows for communications between a given processing element and other processing elements, as may be found in a processor that implements a plurality of SIMD processing elements, and between a given processor and various regions of memory.

Figure 1:
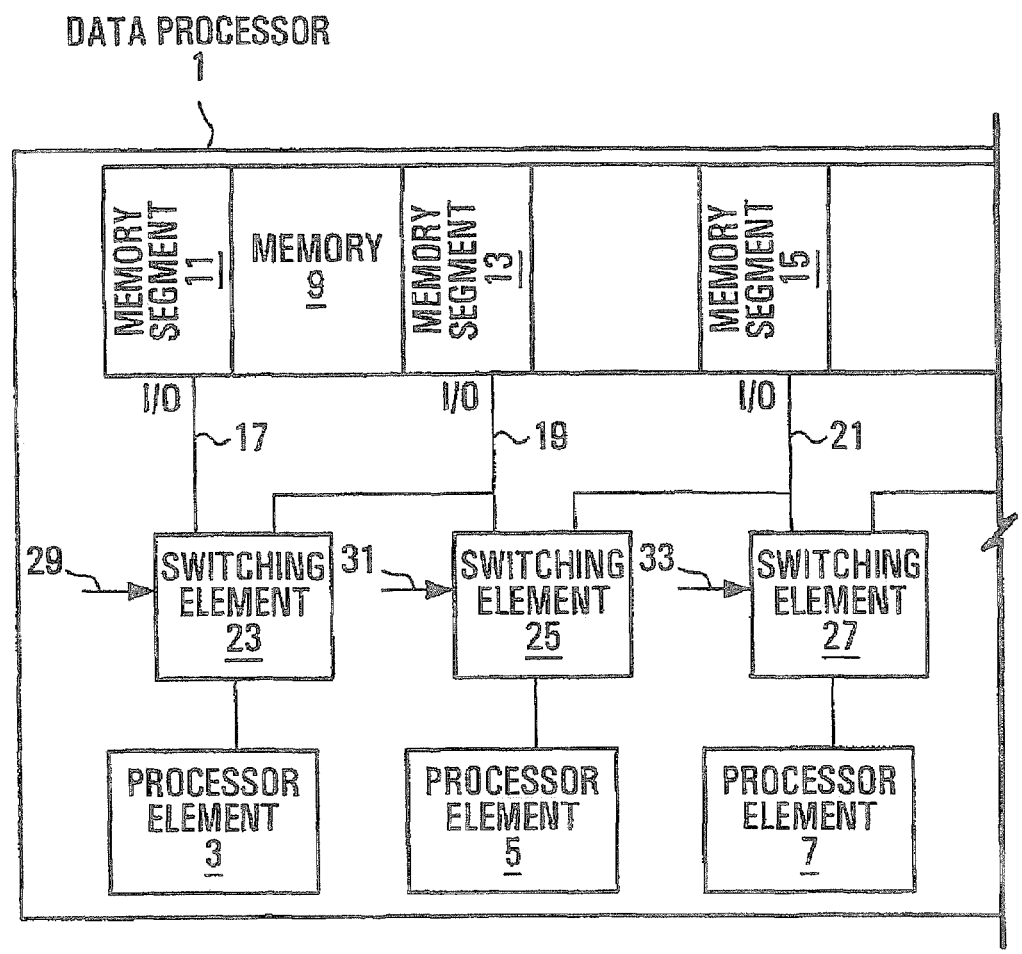
FIG. 1 shows a block diagram of a data processor according to an embodiment of the present invention.

Referring to FIG. 1, a data processor 1, according to an embodiment of the present invention, comprises a plurality of processor elements (PE) 3, 5, 7 and a memory 9, which may for example comprise a random access memory (RAM). The memory includes a plurality of segments 11, 13, 15 and each segment has an associated input/output port 17, 19, 21 to permit read/write access to a respective memory segment. Each memory segment may comprise a one dimensional array (e.g. a column) or a two-dimensional array (e.g. containing a plurality of rows and columns) of one bit memory or storage elements. The memory may include a row selector to select a particular row of memory elements and each segment may include a column selector to select a particular column of memory elements and to connect that column to the I/O port, if each segment contains more than one column of memory elements.

The data processor 1 further includes a plurality of switching elements (SE) 23, 25, 27. The first switching element 23 is coupled to the I/O ports 17, 19 of the first and second memory segments 11, 13 and is switchable to selectively couple one of the first and second memory segments 11, 13 to the first processor element 3. Similarly, the second switching element 25 is coupled to the I/O ports 19, 21 of the second and third memory segments 13, 15 and is arranged to selectively couple either the second or third memory segment 13, 15 to the second processor element 5. The third switching element 27 is coupled to the third memory segment 15 and possibly to a fourth memory segment (not shown) and may be arranged to selectively couple the third memory segment 15 or the fourth memory segment to the third processor element 7. The first switching element 23 may be arranged to provide at least one of read access by the first (i.e. its local) processor element to at least one of the first (i.e. its local) memory segment 11 and to the second (i.e. its remote, e.g. neighbouring or more remote than neighbouring) memory segment 13, and write access from the first processor element 3 to at least one of the first and second memory segments 11, 13. Similarly, the second and/or third switching elements 25, 27 may be arranged to provide at least one of read access to at least one of its local and remote memory, and write access from the processor element to at least one of its respective local and remote memories. The switching of each switching element 23, 25, 27 may be controlled by applying a control signal to a respective control signal input port 29, 31, 33.

Advantageously, the switching arrangement shown in FIG. 1, allows each processor element direct access not only to its local memory segment but also to the local memory segment of another processor element. This enables each processor element to perform calculations based on data contained in its local and associated remote memory segments. For example, in one embodiment, each processing element includes first and second local registers for storing data from its local memory and data from its associated remote memory, respectively, and an arithmetic logic unit (ALU) for performing a calculation based on the contents of these registers. This arrangement is particularly beneficial for image processing, where a comparison is made between the value of one pixel and that of another pixel, for example a neighbouring pixel for motion estimation and/or data compression.

In one embodiment, each of the switching elements may be controlled to provide the same memory segment to processor element coupling at the same time. For example, each switching element may first be controlled to couple each processor element to its local memory segment for read access. Secondly, each switching element may be controlled to couple each processor element to its respective remote or neighbouring memory segment for read access. Thirdly, each processor element may be controlled to perform an operation based on the data from its local and associated remote memory segment and subsequently to output the result of the operation. Each switching element may then be controlled to write the result of the operation into either its local or remote memory segment. Advantageously, controlling all of the switching elements to perform the same switching operation avoids memory segment and processor element access conflicts and enables all of the switching elements to be controlled simultaneously by the same control signal or instruction. This form of processing is particularly applicable to digital image processing and allows image pixels to be processed in parallel.

The embodiment shown in FIG. 1, illustrates an example of a switching arrangement in which each processor element has access either to its local memory segment or to the memory segment to its right (i.e. East). In another embodiment, each switching element may be arranged to provide each processor element access to its local memory segment or to a remote memory segment to its left (i.e. West). In a further embodiment, each switching element may be arranged to permit each processor element selective access to either its local memory segment, a remote (e.g. neighbouring) memory segment to its right (East), or to a remote (e.g. neighbouring) memory segment to its left (West). An example of such a switching arrangement is shown in FIG. 2.

Figure 2:
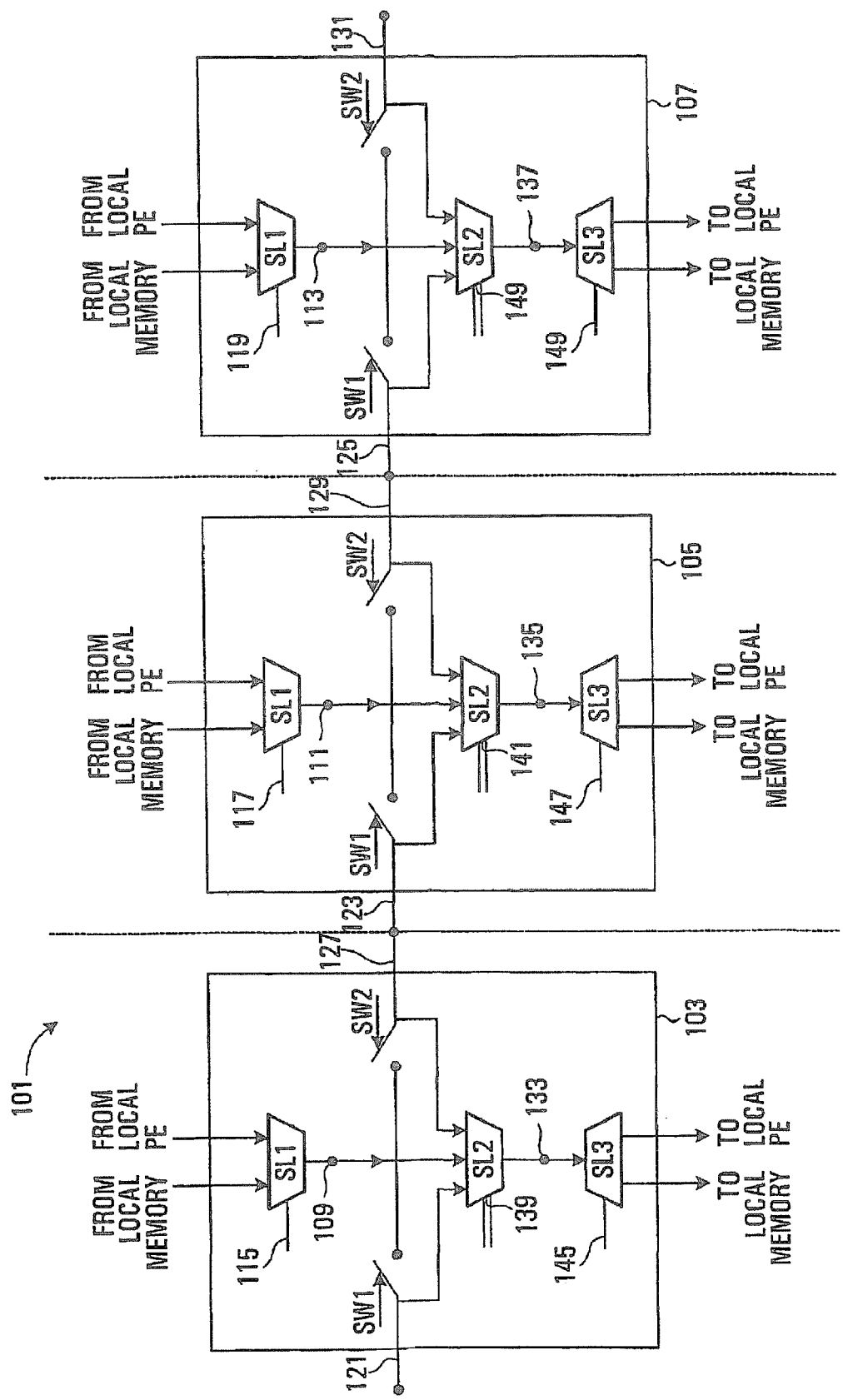
FIG. 2 shows a diagram of an access switching arrangement according to an embodiment of the present invention.

Referring to FIG. 2, the switching arrangement 101 according to an embodiment of the present invention, comprises a plurality of switching elements 103, 105, 107. Each switching element includes a first port 109, 111, 113, which is coupled to the output of a selector switch (SL1), which selectively couples the first port either to the local memory (segment) associated with each switching element or the local processor element associated with each switching element, the switching being controlled by a control signal applied to a control signal input port 115, 117, 119. Each switching element further comprises a second port 121, 123, 125 (located to the left, or west, of each switching element in this embodiment), and a third port 127, 129, 131 (situated to the right or east of each switching element, in this embodiment). The east port 127 of the first switching element 103 is coupled to the west port 123 of the second switching element 105, and the east port 129 of the second switching element 105 is coupled to the west port 125 of the third switching element 107. Each switching element 103, 105, 107 further includes first and second switches SW1, SW2, the first switch SW1 being arranged to couple/de-couple the first port 109, 111, 113 of each switching element to the west port 121, 123, 125, and the second switch SW2 being arranged to couple/de-couple the first port 109 to the east port 127, 129, 131 of each switching element.

Each switching element 103, 105, 107 further includes a second switch selector SL2 connected to each of the first, second and third ports of each switching element, and which is arranged to selectively couple one of the first, second and third ports to a fourth port 133, 135, 137, under the control of a control signal applied to its control signal input port 139, 141, 143. Each of the fourth ports 133, 135, 137 are coupled to a third selector switch SL3 for selectively switching the output from the second selector switch either to the local memory associated with the switching element or to the local processor element associated with the switching element. Switching of each selector switch SL3 is controlled by a control signal applied to its control signal input port 145, 147, 149.

The switching arrangement 101 shown in FIG. 2 is configurable to permit data transfer between local memory and local processor element, or between the local memory or local processor element associated with one switching element and the local memory or local processor element associated with a neighbouring switching element to which it is coupled. Examples of various modes of operation of the switching element 101 will now be described.

According to a first mode of operation each switching element is configured to permit its local processor element to read from its local memory. In this mode, selector switch SL1 is controlled to couple each of the first ports 109, 111, 113 to a respective local memory, switches SW1 and SW2 are both open (as shown), the second selector switch SL2 is controlled to couple the first port 109, 111, 113 to the fourth port 133, 135, 137, and the third selector switch SL3 is controlled to couple the fourth port 133, 135, 137 to the local processor element.

In a second mode of operation, each switching element is configured to write from its local processor element to its local memory, in which case the first selector switch SL1 is controlled to couple the output of its local processor element to the first port 109, 111, 113, the first and second switches SW1, SW2 are both open, the second selector switch SL2 is controlled to couple the first port 109, 111, 113 to the fourth port 133, 135, 137, and the third selector switch SL3 is controlled to couple the fourth port 133, 135, 137 to the local memory.

In a third mode of operation, each switching element is configured to transfer data from its local memory to the local processor element of the switching element to its right (east). In this mode, the first switching element SL1 is controlled to couple the first port 109, 111, 113 to the local memory, the first switch SW1 of each switching element is open, the second switch SW2 of each switching element is closed to connect the first port 109, 111, 113 to a respective east port 127, 129, 131, the second selector switch SL2 is controlled to couple a respective west port 121, 123, 125 to the fourth port 133, 135, 137. In this configuration, the first port 109, 111, 113 of each switching element is connected to the fourth port 135, 137 of the neighbouring switching element to its right. Finally, the third switch selector SL3 is controlled to couple the fourth port 133, 135, 137 to its local processor element.

In another mode of operation, each switching element is configured to write from its local processor element into the local memory associated with a switching element to its right (east). In this case, each switching element is configured in a similar way to that described immediately above in connection with a memory read access, except that the first selector switch SL1 is controlled to couple the local PE to the first port 109, 111, 113, and the third selector switch SL3 is controlled to couple the fourth port 133, 135, 137 to the local memory.

In another mode of operation, each switching element is configured to transfer data from its local memory to a processor element associated with a switching element to its left (west). In this mode, each first selector switch SL1 is controlled to couple the first port 109, 111, 113 to the local memory, the first switch SW1 is closed to couple the first port 109, 111, 113 to the left port 121, 123, 125, and the second switch SW2 is open. The second selector switch SL2 is controlled to couple the right port 127, 129, 131 of each switching element to the fourth port 133, 135, 137, so that the first port of each switching element is effectively coupled to the fourth port of the switching element to its left. Finally, the third selector switch SL3 is controlled to couple the fourth port 133 to the local processor element.

In another mode of operation, each switching element may be configured to write the output of its local processor element to the local memory associated with the switching element to its left (west). This mode is similar to that described immediately above in connection with a west read access, except that the first selector switch SL1 is controlled to couple the first port 109, 111, 113 to the output of its local processor element, and the third selector switch SL3 is controlled to couple the fourth port 133, 135, 137 to its local memory.

In each of the switching modes described above, each switching element has the same configuration, and therefore conveniently, the same set of control signals can be applied to the switches SW1, SW2 and the selector switches SL1, SL2, SL3 of each switching element. Therefore, the control lines for corresponding switches and selector switches can be connected together, substantially simplifying and reducing the number of control wires which would otherwise be required if each element was controlled independently of the others.

Any number of switching elements may be used to transfer data between any number of processor elements or their respective memory segments. Generally, one switching element is required for each processor element.

Byte-Wise Processing and Data Transfer

In one embodiment, each processor element is capable of processing a single bit, and a plurality of processor elements may be functionally grouped together to process a multiple bit word, for example, a byte (8 bits). A group of processor elements which function to operate on a multiple bit word will be referred to as a computational unit (CU).

Figure 3:
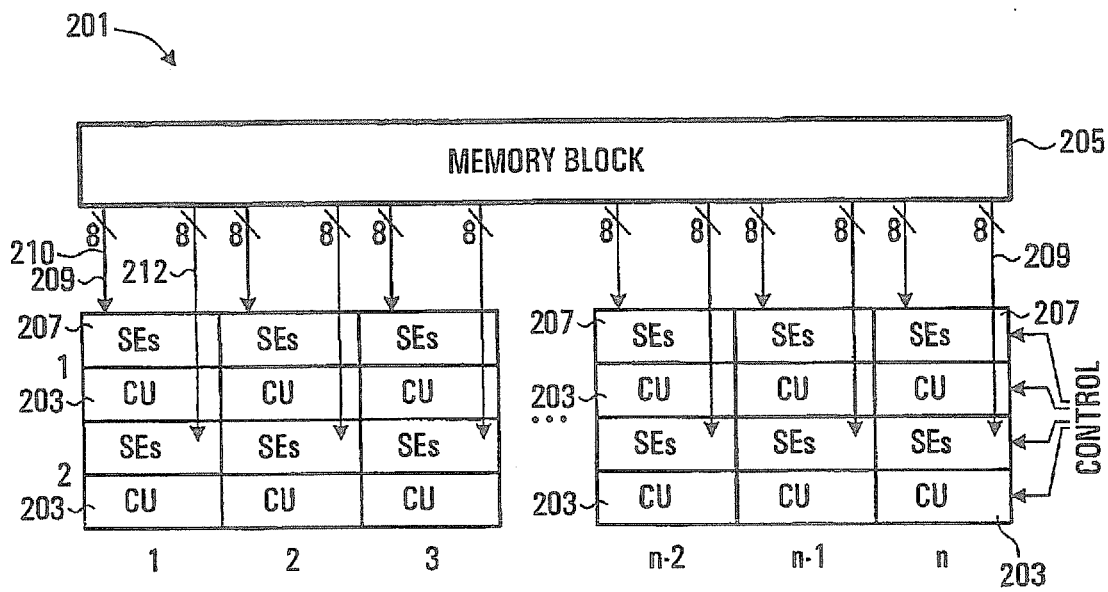
FIG. 3 shows a schematic diagram of a data processor apparatus according to an embodiment of the present invention.

FIG. 3 shows an example of a data processor having a plurality of computational units, and a switching arrangement which allows the transfer of multiple bit words between computational units and/or between computational units and the local memories associated with other computational units (and optionally between memory segments).

Figure 4:
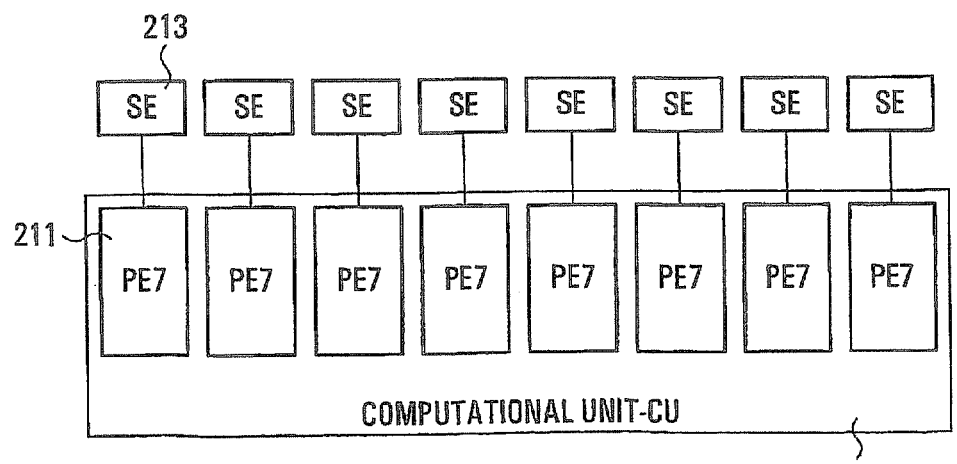
FIG. 4 shows a schematic diagram of a computational unit according to an embodiment of the present invention.

Referring to FIG. 3, the data processor 201 comprises a plurality of computational units (CU) 203, a memory block 205 and a plurality of groups of switching elements (SEs) 207. In this embodiment, the computational units are arranged in a two-dimensional array having two rows, row 1 and row 2 and n columns. Each computational unit has 8 processor elements allowing the computational unit to perform byte processing, and an associated group of switching elements 207, each containing 8 switching elements, one switching element for each processor element. This configuration is shown in FIG. 4, in which a computational unit 203 includes 8 processing units 211, each connected to a switching element 213. Returning to FIG. 3, each computational unit 203 has 8 memory I/O ports associated therewith, one for each processor element of the computational unit, and in which a respective I/O port is coupleable to a respective processor element through a respective switching element. Thus, in this embodiment, each 8 bit computational unit is pitch-matched to the I/O ports of the memory. In the arrangement shown in FIG. 3, the first set of 8 I/O ports 210 and each alternate set of 8 I/O ports is associated with a successive computational unit 203 in the first row, and the second set of 8 I/O ports 212 and each alternate set of 8 I/O ports is associated with each successive computational unit in the second row.

Figure 5:
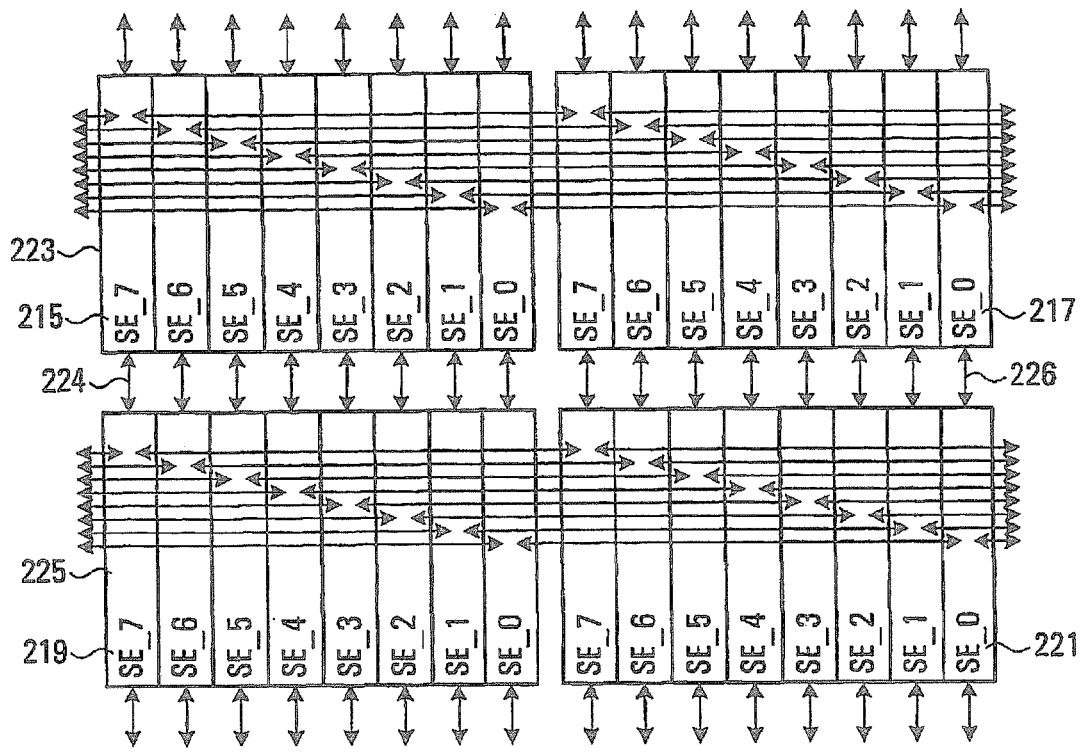
FIG. 5 shows a schematic diagram of a switching element interconnect scheme according to an embodiment of the present invention.

Each group of 8 switching elements 207 is connected to an adjacent group of switching elements to allow byte transfer of data from one group to an adjacent group, as shown in FIG. 5.

Referring to FIG. 5, four groups of switching elements 215, 217, 219, 221 are shown, in which the first two groups 215, 217 occupy a first row 223 and the third and fourth groups 219, 221 occupy a second row 225. Each group contains eight switching elements labelled 0 to 7. Each group has an associated computational unit and an associated local memory (not shown), wherein each local memory is capable of storing at least one byte of data (containing 8 bits), and each computational unit is capable of byte-wise processing.

In order to perform byte-wise transfer between a computational unit or local memory associated with one group of switching elements and a computational unit or local memory associated with an adjacent group of switching elements, each switching element of one group is connected to a switching element of the adjacent group which has a corresponding bit significance. Thus, as shown in FIG. 5, switching element 0 of the first group 215 is directly connected to switching element 0 of the second, adjacent group 217 (when position 0 may correspond to the least significant bit (LSB)). Similarly, each of the other switching elements 1 to 7 of the first group 215 is connected to a corresponding switching element 1 to 7 of the second group 217 (where position 7 may correspond to the most significant bit (MSB)). These connections allow east-west or west-east byte-wise transfer between the local memory or computational unit associated with the first group of switching elements 215 and the second group of switching elements 217. The switching elements of the third and fourth groups 211, 221 are connected in like manner to permit east to west or west to east byte-wise transfer between the computational unit or local memory associated with the third group of switching elements 219 and the computational unit or local memory associated with the fourth group of switching elements 221.

In the embodiment shown in FIG. 5, the first and third group of switching elements 215, 219 are also connected to permit north-south or south-north byte-wise transfer between the computational unit or local memory associated with the first group of switching elements 215 and the computational unit or local memory associated with the third computational unit 219. To permit this byte-wise transfer, each switching element associated with the first group 215 is connected to a switching element of the third group 219 which has corresponding bit significance. Thus, the switching element 0 of the first group 215 is directly connected to the switching element 0 of the third group 219, and each of the other switching elements 1 to 7 of the first group 215 is directly connected to a corresponding switching element 1 to 7 of the third group, as shown by the arrows 224. The second and fourth groups of switching elements 217, 221 are also coupled to permit north to south and south to north byte-wise transfer between the computational unit or local memory associated with the second group of switching elements 217 and the computational unit or local memory associated with the fourth group of switching elements 221. Again, to enable this byte-wise transfer, each of the switching elements of the second group 217 is connected to a switching element of the fourth group 221 having the same bit significance. Thus, the switching element 0 of the second group 217 is directly coupled to the switching element 0 of the fourth group 221 and each of the other switching elements 1 to 7 of the second group 217 is directly coupled to a corresponding switching element 1 to 7 of the fourth group 221, as shown by the arrows 226.

It can be seen from the embodiment shown in FIG. 5, that the switching arrangement allows byte-wise transfer between the computational unit or local memory associated with one group of switching elements and the computational unit or local memory associated with an adjacent group of switching elements displaced in the east/west direction and a group of switching elements displaced in the north/south direction. The array of groups of switching elements can be extended limitlessly to any size of array so that byte-wise data transfer can be permitted between a computational unit and/or local memory associated with any group of switching elements and the computational unit and/or local memory associated with any other adjacent switching element in the same row or the same column. This arrangement is particularly advantageous in video image processing as it allows a pixel, which is typically described by an 8 bit word to be compared with each of its north, south, east and west neighbours, and each comparison can be performed for all pixels in parallel. Thus, for example, one parallel operation may involve the transfer of a byte of data from the memory associated with each group of switching elements to the computational unit associated with its adjacent southern neighbour, for comparison with a byte stored in the memory of its southern neighbour. Another parallel operation may involve the transfer of a byte from a local memory associated with each group of switching elements into the computational unit associated with its immediate northern neighbour for comparison with a byte stored in the memory associated with its northern neighbour. Other parallel operations including for example east and west byte-wise transfers may also be performed. In addition to performing north to south (or south to north) and east to west (or west to east) byte-wise transfers, it may also be desirable to perform byte-wise transfers between neighbouring groups of switching elements on the diagonal. An example of a two dimensional array of computational units in which byte-wise transfers between a computational unit and its nearest eight neighbours is shown in FIG. 6.

Figure 6:
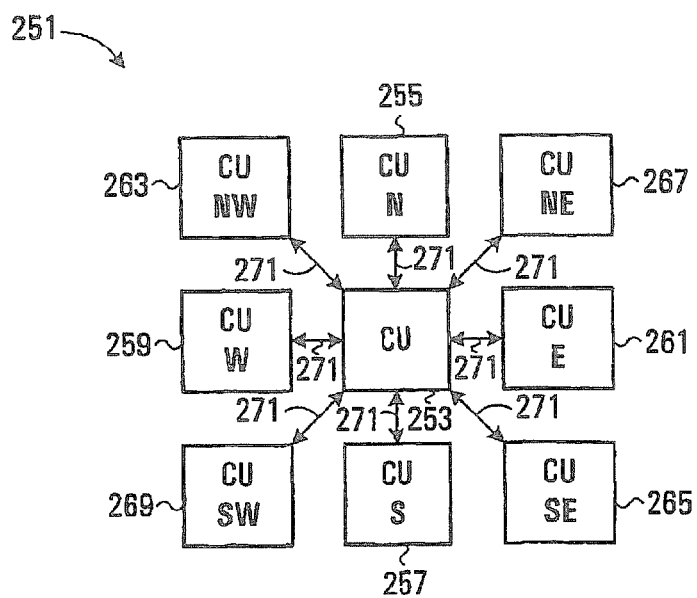
FIG. 6 shows a diagram of an array of computational units according to an embodiment of the present invention.
Figure 7:
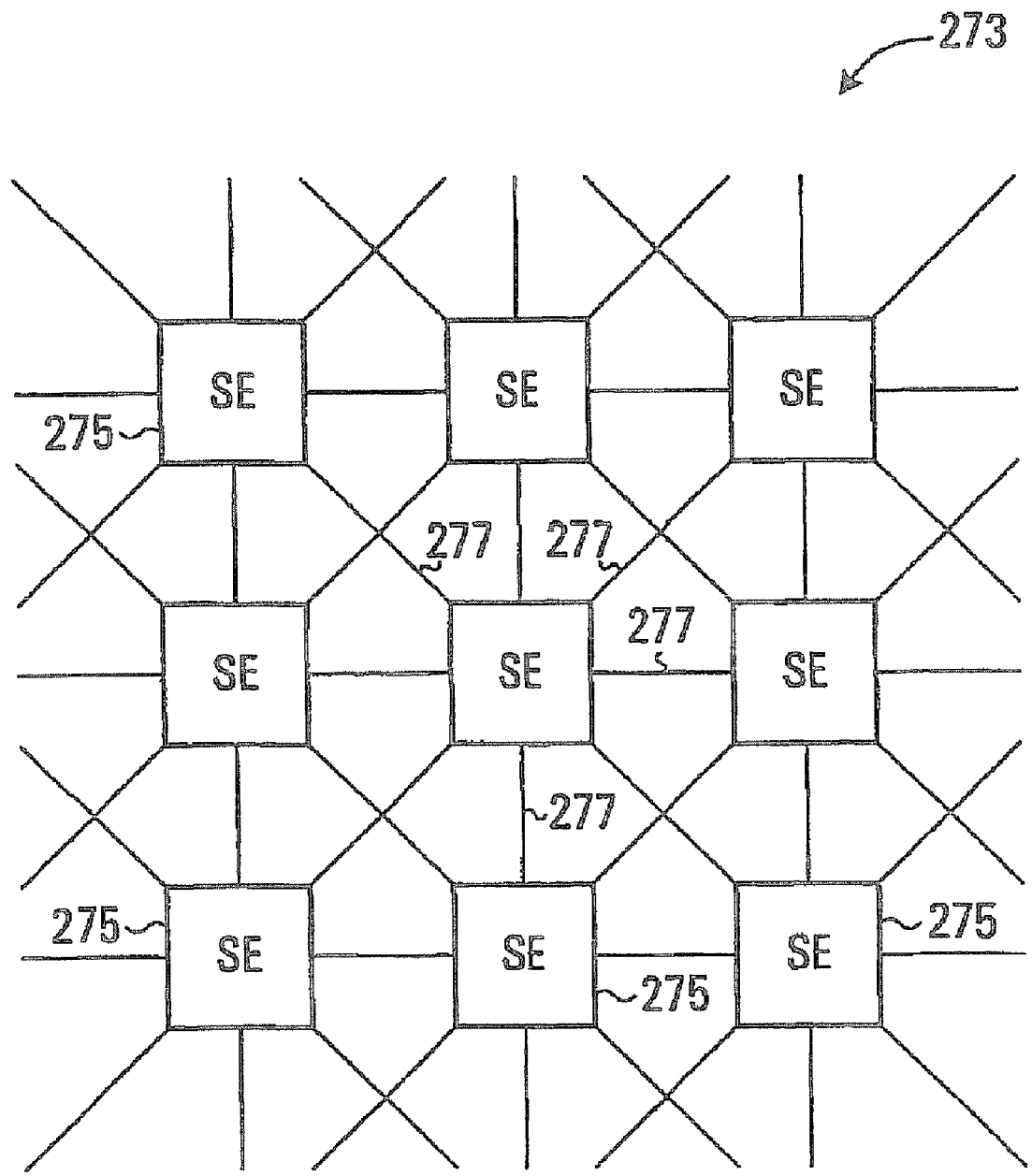
FIG. 7 shows a diagram of a two-dimensional array of switching elements and an interconnect scheme according to an embodiment of the present invention.

FIG. 6 shows a two-dimensional, three-by-three array 251 of nine computational units, in which the central computational unit 253 has 8 nearest neighbours, which include its adjacent computational units 255 to the north and 257 to the south in the same column, its adjacent computational units 259, to the west, and 261 to the east in the same row, and its immediately adjacent computational units 263 to the north-west and 265 to the south-east on one diagonal, and its immediately adjacent computational units 267 to the north-east and 269 to the south-west, on the other diagonal. In order to permit data transfer between the central computational unit 253 or its local memory and the computational unit or local memory of each of its 8 nearest neighbours, each computational unit and local memory has an associated switching element. In one embodiment, the switching element associated with the central computational unit 253 may be connected to each of the switching elements associated with each of its nearest neighbours and each switching element may have 8 input-output ports or buses extending therefrom to connect to each of its neighbours, as shown schematically by the arrows 271 in FIG. 6. An example of an interconnect scheme in which each switching element is connected to each of its nearest neighbours by one of eight buses, is shown in FIG. 7. FIG. 7 shows a two-dimensional, three-by-three array 273 of switching elements 275, in which each switching element has 8 ports or buses 277 extending therefrom for connecting to each of its nearest neighbour switching elements (for example to a bus or port of each element).

Figure 8:
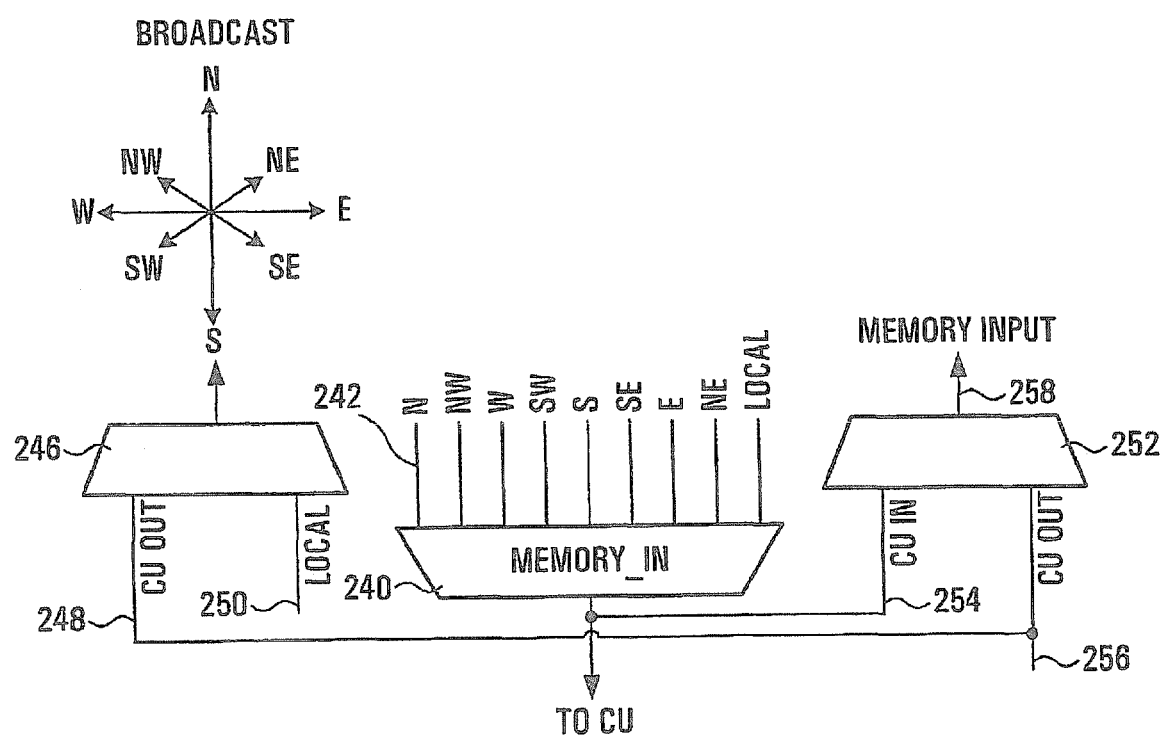
FIG. 8 shows an embodiment of a switching element, which may be used in the interconnect scheme of FIG. 7.

FIG. 8 shows an embodiment of a switching element which may be implemented in the interconnect scheme of the embodiment shown in FIG. 7. The switching element comprises a first multiplexer 240 having nine inputs 242 and an output 244. Eight of the inputs are for coupling to neighbouring switching elements and the remaining input is for coupling to the local unit, for example a memory or processor element output. The switching element further includes a second multiplexer 246 having a first input 248 coupled to an output port of the local PE, and a second input port 250 for receiving data from the local unit, e.g. the local memory. The output of the second multiplexer is broadcast to other switching elements. The switching element further includes a third multiplexer having a first input connected to the output of the first multiplexer, and a second input coupled to an output of the local processor element. The output of the third multiplexer is coupled to the local memory input.

Figure 9:
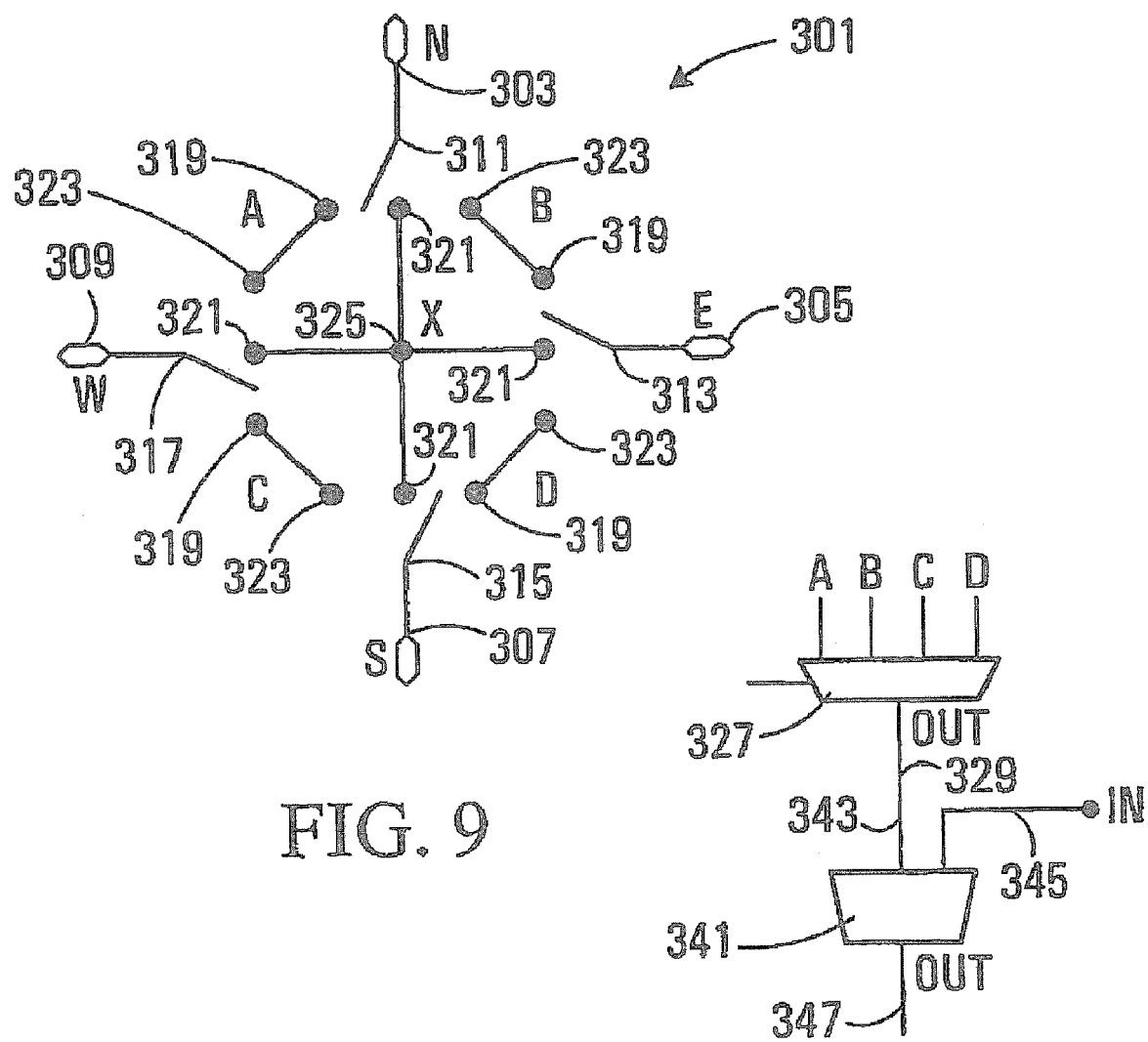
FIG. 9 shows a diagram of a switching element, according to another embodiment of the present invention.

An embodiment of a switching arrangement which advantageously allows the number of buses to be reduced, while still retaining the connectivity of a local memory and/or processor element to its nearest 8 neighbours will now be described below. Referring to FIG. 9, a switching element 301 has four input/outputs 303, 305, 307, 309. In this embodiment, the first and third output ports 303, 307 lie on a first north to south axis and the second fourth input/output port 305, 309 lie on a transverse axis, which in this embodiment is a substantially orthogonal, east to west axis which enables other similar switching elements to be connected to each of the input/output ports in a two-dimensional grid pattern (which will be described below), although other arrangements are also possible.

The switching element 301 further includes four switches 311, 313, 315, 317, the first switch 311 being connected to the first input/port 303, the second switch 313 being connected to the second input/output port 305, the third switch 315 being connected to the third input/output port 307 and the fourth switch 317 being connected to the fourth input/output port 309. Each switch is switchable between three terminals 319, 321, 323, and further includes at least one neutral position in which the switch is not connected to any of the three terminals. The switching element 301 further includes an input port 325 which is connected to each middle terminal 321 of the four switches. Each one of the other two terminals of each switch is connected to the terminal of an orthogonal switch on the same side. Thus, the first terminal 319 associated with the first switch 311 is connected to the third terminal 323 of the fourth switch 317. The third terminal 323 associated with the first switch 311 is connected to the first terminal 319 of the second switch 313. Similarly, the first terminal 319 of the third switch 315 is connected to the third terminal 323 of the second switch 313, and the third terminal 323 of the third switch 315 is connected to the first terminal 319 of the fourth switch 317.

The switching element further includes an output selector switch 327 having four inputs A, B, C and D and an output 329. A respective one of the four inputs A, B, C and D is connected to a respective one of the interconnected switch terminal couples 319, 323 also labelled A, B, C and D (although these interconnections are not shown for clarity). This embodiment further includes a second selector switch 341 having two inputs 343, 345 and an output 347. The first input 343 is connected to the output 329 of the first selector switch 327 and the second input 345 is connected to the input port 325 of the switching element (although this connection is also not shown for clarity).

The switching element 301 is capable of directing data received at the input 325 either to local elements (e.g. local memory or local processor element) associated with the switching element, or to one of the four input/output ports 303, 305, 307, 309. The input port 325 may be coupled to receive data from its associated local memory, or the output of its associated local processor element, and a switch may be provided to selectively couple the input port 325 to one of the associated local memory and an output of the associated processor element.

The switching element 301 is also capable of directing data received at any one of its four input/output ports 303, 305, 307, 309 to the output port 329 of the first selector switch 327 and to the second output port 347 of the second selector switch 341, depending on its state. The switching element is also capable of transferring data received at the input port 325 to the output port of the second selector switch 347 again depending on its state. In one embodiment, the output 347 of the second selector switch 341 is connected to the input of the local processor element associated with the switching element 301. Thus, in one mode of operation, the switching element is capable of transferring data received at its input 325 to its output 347, for example to enable the transfer of data from its local memory to its local processor element. In another mode of operation, the switching element is capable of transferring data received at any one of the four input/output ports to its associated local processor element. Examples of the various possible operating modes of the switching element 301 will now be described below.

To perform a data transfer to the south, the third switch 315 is controlled to couple the input port 325 to the third (south) input/output port 307 so that data from the local unit (e.g. local memory or local processor) is transferred to the south port 307. At the same time, the first switch 311 is controlled to couple the first (north) input/output port 303 either to its first terminal 319 or to its third terminal 323, thereby coupling the north port 303 either to the first input A or the second input B of the first selector switch 327. The second selector switch 327 is controlled to couple the input port to which the first switch 311 is connected, to the output port 329. The second selector switch 341 is controlled to connect its first input port 343 to the output port 347, which is connected to an input of the local unit (e.g. memory or local processor) associated with the switching element 301. Thus, in this mode of operation, the switching element is configured to transfer data from the local unit to the south port 307 and to transfer data into the local unit via the north port 303.

In another mode of operation, the switching element 301 may be controlled to transfer locally derived data to its north neighbour and simultaneously to receive data derived from its southern neighbour. In this mode, the first switch 311 is controlled to connect the north input/output 303 to the input port 325 of the switching element 301, and the third switch 315 is controlled to connect the south port 307 to one of the first and third terminals 319, 323 associated with the third switch 315, to connect the south port 307 to one of the third or fourth inputs C, D of the first selector switch 327, and the second selector switch is controlled to output the data to the local unit.

In another mode of operation, the switching element may be configured to transfer locally derived data to its east neighbour and to receive data from its west neighbour. In this mode of operation, the second switch 313 is controlled to couple the input 325 of the switching element 301 to the east port 305, and the fourth switch 317 is controlled to connect the west port 309 to one of the first or third terminals 319, 323 associated with the fourth switch 317 to couple the west port 309 to one of the first and third input ports A, C of the first selector switch 327. The first selector switch 327 is controlled to connect the appropriate input port A, C to its output port 329 and the selector switch 341 is appropriately controlled to output the data received at the west port 309 to the local unit.

In a fourth mode of operation, the selector switch 301 is configured to transfer data to its west neighbour and to receive data from its east neighbour. In this mode, the fourth switch 317 is controlled to couple the input port 325 of the switching element 301 to the west port 309, and the second switch 313 is controlled to couple the east port 305 to one of the first and third terminals 319, 323 associated with the second switch 313, so that the east port 305 is coupled to one of the second and fourth inputs B, D of the first selector switch 327. The first and second selector switches 327, 341 are appropriately controlled so that data received at the east port 305 is transferred to an input of the local unit (e.g. local memory or local processor. element).

In each of the modes described above for a north to south, south to north, east to west and west to east transfer, the switching element 301 assumes both an output mode for transferring data out from one of its north, south, east or west ports and an input mode for receiving data at the respective opposite port. The switching element 301 can also be configured to operate in any one of four further modes to allow the transfer of data received at any one of its input/output ports 303, 305, 307, 309 to an adjacent orthogonal input/output port 303, 305, 307, 309 for transferring data between diagonally disposed nearest neighbours. To perform a diagonal data transfer, each switching element 301 is configured to operate in an input mode, for receiving data at one of its input/output ports 303, 305, 307, 309 and transferring the received data to the local unit, an orthogonal output mode, in which locally derived data is output at a port which is orthogonal to the input/output port established for the input mode, and a by-pass or pass-through mode, in which the other two adjacent orthogonal input/output ports are interconnected to allow the transfer of data received at one of these ports to the other remaining port. The switching element 301 is capable of adopting all three modes simultaneously to enable diagonal (e.g. NE, NW, SE, SW) nearest neighbour or more remote diagonal data transfers.

An example of how switching elements may be configured to enable a diagonal data transfer will now be described with reference to FIG. 10.

Figure 10:
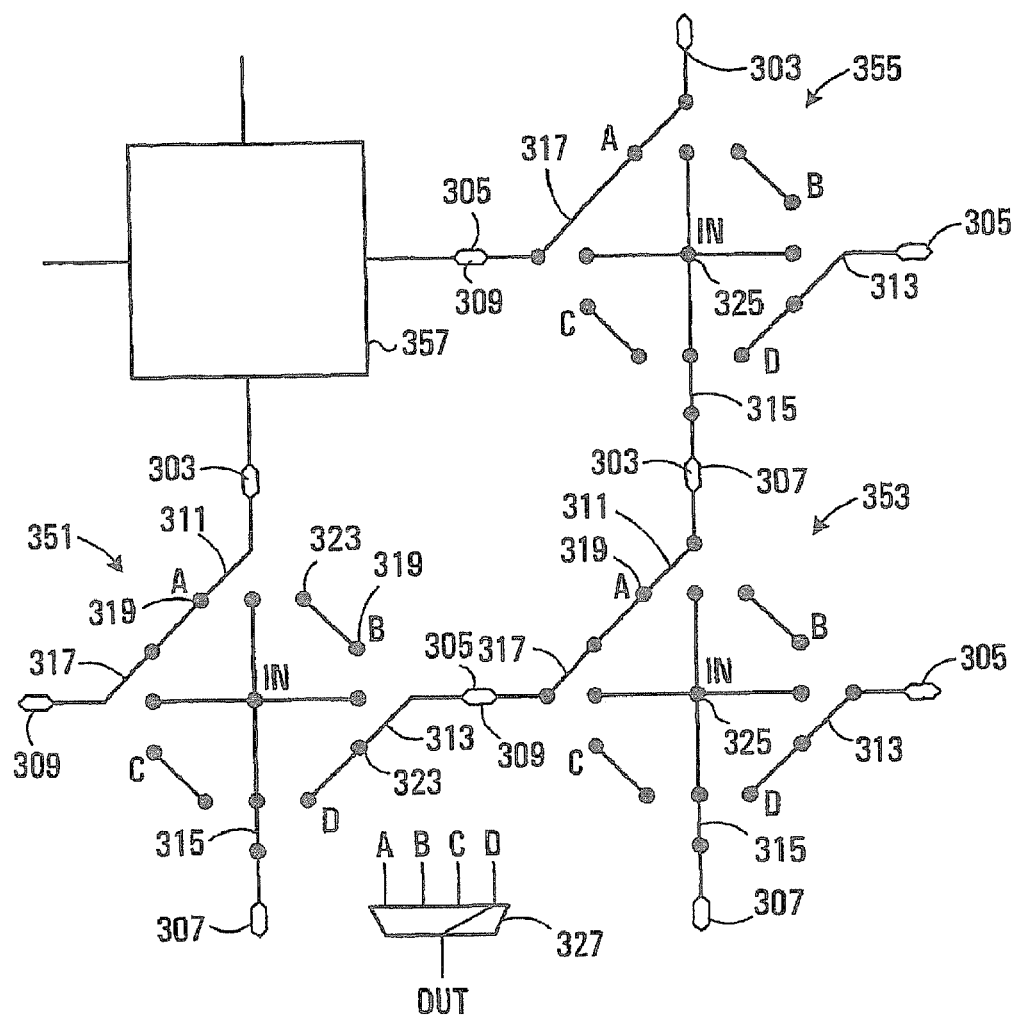
FIG. 10 shows an array of interconnected switching elements of the embodiment shown in FIG. 8.

FIG. 10 shows an array of three switching elements 351, 353, 355, each of which is similar to the switching element 301 shown in FIG. 9, and like parts are designated by the same reference numerals. The switching elements are interconnected such that the east input/output port 305 of the first switching element 351 is connected to the west input/output port 309 of the second switching element 353, and the north input/output 303 of the second switching element 353 is connected to the south input/output port 307 of the third switching element 355. Thus, the second switching element 351 constitutes the east neighbour (which may or may not be the nearest east neighbour) to the first switching element 351, and the third switching element 355 constitutes the Northeast neighbour (which may or may not be the nearest Northeast neighbour) to the first switching element 351. It is to be noted that the array of three switching elements shown in FIG. 10 may be part of a larger array of switching elements and that FIG. 10 simply serves to illustrate an arrangement of switching elements which enable a transfer between one switching element and another switching element on its Northeast diagonal.

To perform a transfer of data locally derived at the third switching element 355 to the first switching element 351, the third switching element 355 assumes an output mode, in which the third switch 315 is controlled to connect the input port 325 of the third switching element 355 to its third (south) input/output port 307, so that locally derived data is transferred onto the output port 307. The second switching element 353 assumes a pass-through mode, in which the first switch 311 is connected to its associated first terminal 319, and the fourth switch 317 of the second switching element 353 is connected to its associated third terminal 309, thereby connecting the first (north) input/output port 303 of the second switching element to its fourth (west) input/output port 309. The first switching element 351 assumes an input mode, in which the second switch 313 of the first switching element 351 is controlled to connect the second (east) input/output port 305 to the third terminal 323 associated with its second switch 313 so that the east input/output port 305 is connected to the fourth input port D of the selector switch 327. The selector switch 327 is controlled to connect the fourth input D to its output port 329 (not labelled on FIG. 10). Thus, it can be seen that the first, second and third switching elements are configured to provide a continuous path from the input port 325 of the third switching element 355 to the output port 329 of the first switching element 351.

It is to be noted in this operating mode that each of the switching elements 351, 353, 355 may all assume the same three operating modes: output mode, pass-through mode and input mode, so that each switching element assumes an output mode in which a respective input port 325 is connected to a respective south port 307, a pass-through mode, in which the first and fourth switches are controlled to couple a respective north port 303 to a respective west port 309, and an input mode, in which a respective east port 305 is connected to a respective output port 329. This symmetrical configuration of all of the switching elements allows same direction, parallel, diagonal transfers between diagonally disposed switching elements in the array. Since each switching element is configured in the same way to perform a given diagonal transfer, all of the switching elements may be configured by the same set of control signals, which enables the control of data transfers between the switching elements to be considerably simplified.

Advantageously, as each switching element is designed to enable data to be transferred from any of its input/output ports to either of its adjacent, orthogonal input/output ports, an effective diagonal data transfer can be performed using the same buses which are used for north-south and east-west data transfers, thereby obviating the need for additional diagonal buses between diagonally disposed switching elements. Thus, the switching elements allow data transfer between a given switching element and its nearest eight neighbours using only four buses rather than eight, thereby considerably simplifying and reducing the cost and complexity of the additional interconnects, which would otherwise be required. This arrangement also alleviates the problem of superimposing or combining a diagonal interconnect system to a "Manhattan geometry", in which the interconnect wires are drawn orthogonally, i.e. in the north, south, east and west directions.

In the embodiments of the switching elements shown in FIGS. 9 and 10, each input mode from any of the input/output ports 303, 305, 309, 311 has two possible configurations. The first configuration is illustrated in FIG. 10, in which for the input mode associated with the transfer of data into the switching element from the east input/output port 305, the second switch 313 is connected to the third terminal 323 associated with the second switch, so that the east input/output port is connected to the fourth port D of the selector switch 327. In the alternative configuration of this input mode, the second switch 313 may be controlled to couple to the first terminal 319 associated with the second switch 313 so that the east input/output 305 is connected to the second input port B of the selector switch 327, in which case the selector switch is controlled to connect the second input port B to its output port 329.

The embodiments of the switching elements shown in FIGS. 9 and 10 allow any diagonal transfer to be performed via all possible routes. In the case of a transfer to a switching element from a Northeast neighbour, one route is to pass the data via its east neighbour, as shown in FIG. 10, and the second route is to pass the data via its north neighbour, for example north neighbour 357 shown schematically in FIG. 10.

Figure 11:
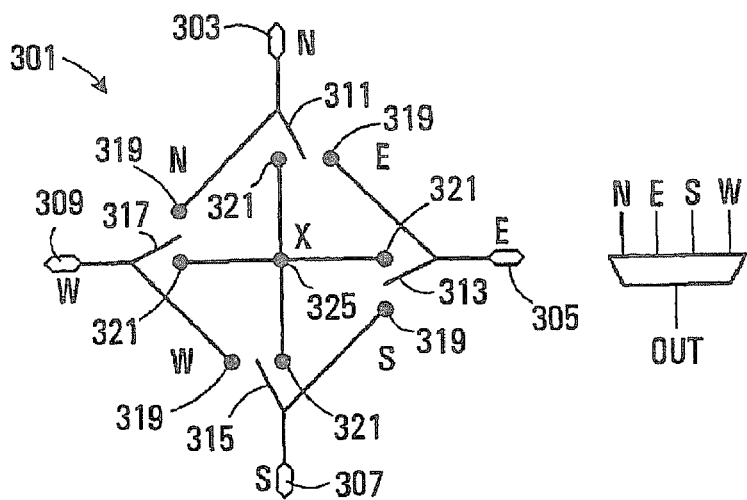
FIG. 11 shows a diagram of a switching element according to another embodiment of the present invention.
Figure 12:
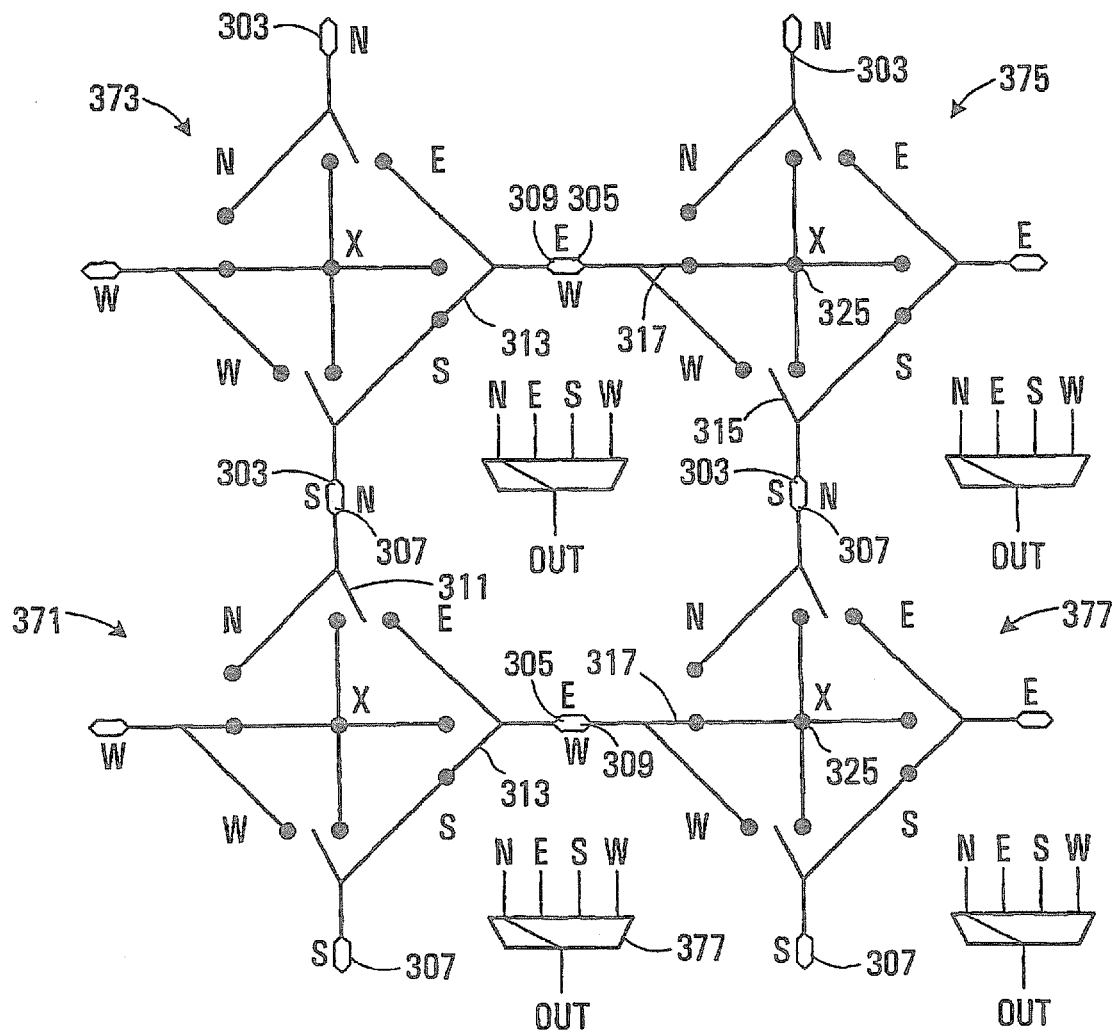
FIG. 12 shows a diagram of an array of switching elements of the embodiment of FIG. 10.

In another embodiment, each of the switching elements may be simplified to permit a diagonal transfer using only one of these two possible routes. An example of another embodiment of a switching element is shown in FIG. 11, and an example of an array of such switching elements is shown in FIG. 12. The switching element shown in FIG. 11 is similar to that shown in FIG. 9, and like parts are designated by the same reference numerals. The switching element 301 comprises four input/output ports 303, 305, 307, 309 having associated switches 311, 313, 315, 317. Each switch has first and second terminals 319, 321, the first terminal 319 (also labelled N, E, S and W) being connected to a respective one of four input terminals, also labelled N, E, S, W of a first selector switch 327. The first terminal 319 associated with each switch is also connected to the input/output port connected to its adjacent switch displaced in the clockwise sense. Thus, the first terminal 319 associated with the first switch (connected to the first (north) input/output port 303)

is connected to the second (east) input/output port 305, the first terminal 319 associated with the second switch 313 is connected to the third (south) input/output port 307, the first terminal 319 associated with the third switch 315 is connected to the fourth (west) input/output port 309, and the first terminal 319 of the fourth switch 317 is connected to the first (north) input/output port 303. The second terminal 321 of each switch is connected to the input port 325 of the switching element.

Each switch is switchable between its associated first and second terminals 319, 321, and a third, neutral or floating state (e.g. between the two terminals), as shown in FIG. 11.

FIG. 12 shows an array of four switching elements of the kind shown in FIG. 11 and will be used to illustrate a diagonal transfer from a Northeast neighbour. The switching elements are arranged such that the north port 303 of the first switching element 371 is connected to the south port 307 of the second switching element (north neighbour) 373, and the east port 305 of the second switching element 373 is connected to the west port 309 of the third switching element 375, and which constitutes the Northeast neighbour of the first switching element 371.

To transfer data from the third switching element 375 to the first switching element 371, the third switching adopts an output mode in which the fourth switch 317 couples the input port 325 to the fourth (west) input/output 309, the second switching element 373 adopts a pass-through mode, in which the second switch 313 connects the second (east) port 305 to the third (south) input/output port 307, and the first switching element 371 adopts an input mode, in which the first switch 311 connected to the first (north) input/output port 303 is in its neural (or floating) position and the selector switch 327 is controlled to couple the first input port N to its output port. In this way, data can be transferred from the local unit (e.g. local memory or processor element) associated with the third (Northeast) switching element 375 to the local unit (e.g. local memory or processor element) associated with the first switching element 371.

It is to be noted that the output mode adopted by the third switching element 375, the pass-through mode adopted by the second switching element 373 and the input mode adopted by the first switching element 371 may all be adopted by all switching elements, as shown in FIG. 12. This enables data to be transferred to each of the second and third switching elements from their respective Northeast neighbours, in an extended array.

It is to be noted that the array shown in FIG. 12 can be extended to any size, and that the switching elements enable data to be transferred in parallel in any of N, S, E, W, NE, NW, SE, SW directions.

Embodiments of the switching element may be implemented using any suitable components, and fabricated using any suitable technology (e.g. CMOS and/or passgate). For example, the switching element may comprise any suitable logic circuitry which can be controlled to perform the required function. An example of one implementation of the switching element of FIG. 11 is shown in FIG. 13, where corresponding parts are designated by the same reference numerals.

Figure 13:
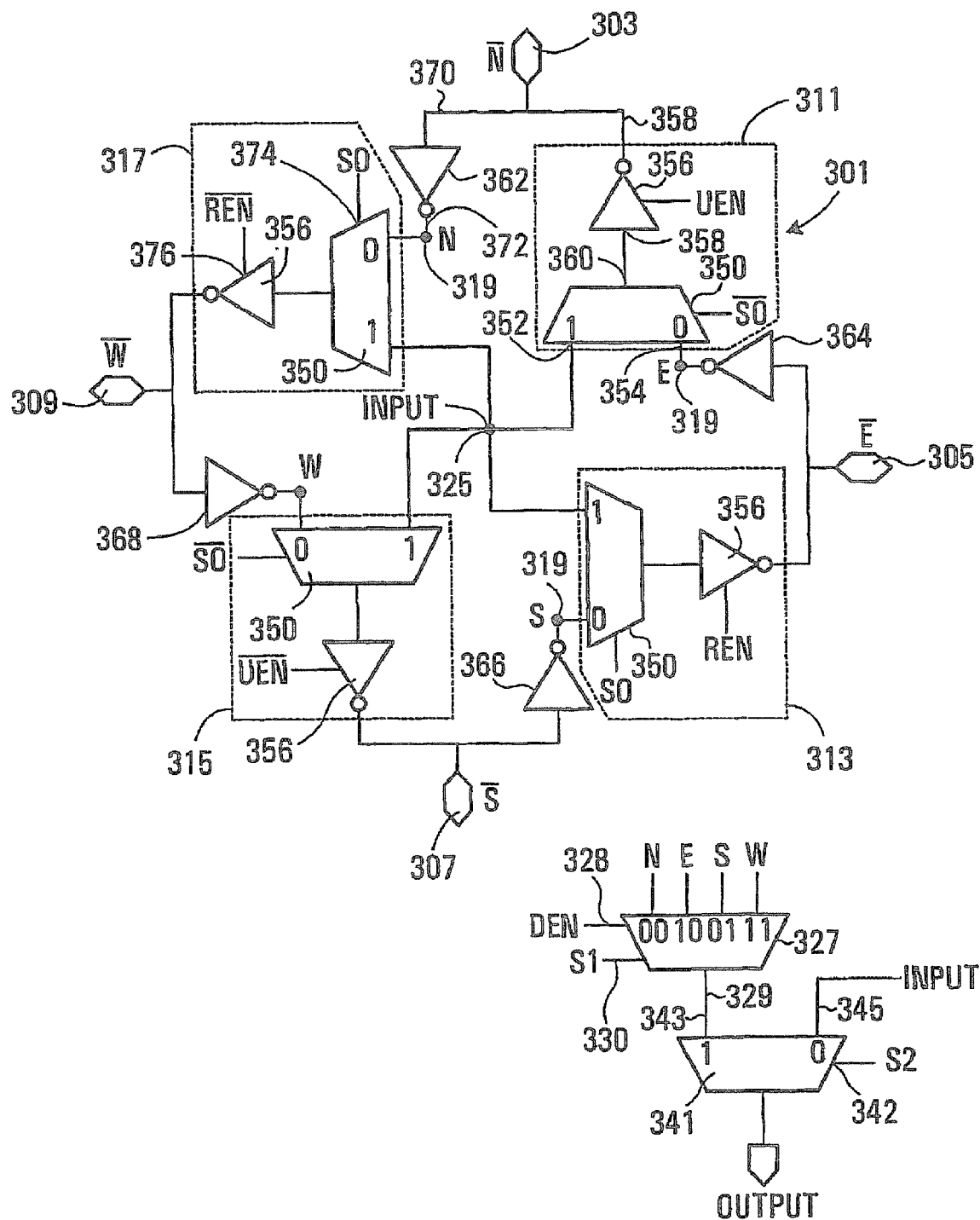
FIG. 13 shows a diagram of a switching element according to another embodiment of the present invention.

Referring to FIG. 13, a switching element 301 has first, second, third and fourth input/output ports 303, 305, 307, 309, each of which has an associated switch 311, 313, 315, 317, as for the embodiment of FIG. 11. Each switch comprises a 2 to 1 multiplexer 350 having a first input port 352 connected to the input port 325 of the switching element, and a second input port 354 connected to the first terminal 319 of each switch. Each switch further comprises a tri-stateable inverter 356 whose input 358 is coupled to the output port 360 of the 2 to 1 multiplexer 350. The output port 362 of the tri-stateable inverter is connected to a respective input/output port 303, 305, 307, 309, with which the switch is associated.

The switching element 301 further includes first, second, third and fourth inverters 362, 364, 366, 368, each having an input port 370 connected a respective input/output port 303, 305, 307, 309, and an output port 372 connected to a respective first terminal 319 of the adjacent switch to its left, so that, for example, the output port 372 of the inverter connected to the north port 303 is connected to the first terminal of the fourth switch 317.

The switching element 301 also comprises a first selector switch 327, which may comprise a multiplexer, having four inputs labelled N, E, S and W which are connected to a respective terminal N, E, S and W coupled to a respective input/output port 303, 305, 309, 311 via an inverter 302. The first selector switch 327 has two control signal input ports 328, 330 for reviewing a control signal for selectively switching one of the inputs N, E, S, W to the output 329. In one embodiment, the output of the first selector switch 327 could be connected to the local processor element associated with the switching element. In another embodiment, the output of the first selector switch 329 could be coupled to the local memory associated with the switching element. In another embodiment, a further selector switch (not shown) may be provided to selectively couple the output of the first selector switch 327 to one of an input to the local memory and an input to the local processor element. In the embodiment shown in FIG. 13, a second selector switch 341 is optionally provided, which may also comprise a multiplexer, and has first and second input ports 343, 345, the first input port 343 being connected to the output port 329 of the first selector switch 327, and the second input port 345 being connected to the input port 325 of the switching element 301. The output port of the selector switch 341 may be coupled to an input of the processor element associated with the switching element 301. The second selector switch 341 has a control signal input port 342 for selectively connecting the output port to one of the first and second input ports 343, 345, in response to a control signal. The second selector switch enables data to be transferred either locally between the local memory and the local processor element or from one of the input/output ports of the switching element into the local processor element.

The 2 to 1 multiplexer 350 of each switch has a control signal input port 374 for receiving a control signal which selectively couples its output port 360 to one of the input port 325 of the switching element 301 and the input/output port which is adjacent and displaced in a clockwise direction relative to the input/output port to which the output of the 2 to 1 multiplexer is connected through its respective tri-stateable inverter 356.

Figures 14, 15:
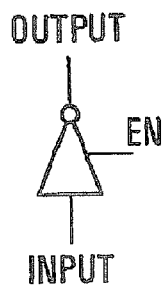
FIG. 14 shows Table 1, which contains the possible states of a tri-stateable inverter.
FIG. 15 shows Table 2, which contains examples of various sets of control signals for controlling the embodiment of the switching element shown in FIG. 13.

The tri-stateable inverter 356 of each switch 311, 313, 315, 317 has a control signal input port 376 for receiving a control signal which, with the signal at the input port controls the signal output from the inverter, according to the table shown in FIG. 14. As can be seen from the table, the tri-stateable inverter can assume a neutral floating position, which implements the neutral or floating position of each switch of the switching element shown in FIG. 11. In this embodiment, the tri-stateable inverter is controlled to adopt this state when the control signal is low (e.g. zero) as shown in the table. When the control signal is in the other state (i.e. high or one) the tri-stateable inverter functions as a simple inverter, by inverting the input signal.

The inverters are arranged such that on transferring data between one switching element and any one its eight neighbours (i.e. N, E, S, W, NE, SE, SW and NW), the data always passes through a minimum of two inverters and, always passes through an equal number of inverters to maintain signal polarity. Advantageously, passing binary data through an inverter pair enhances the signal strength and signal definition, and also enhances the definition of the high to low or low to high transition edge, and thus functions as a repeater.

In an array of switching elements of the kind shown in FIG. 13, data which is transferred between one switching element and any one of its north, south, east or west neighbours, passes through two inverters, one being provided by a tri-stateable inverter 356 on passing the data from the input port 325 to one of the input/output ports 303, 305, 307, 309, and the other being provided by a simple inverter 364 on passing the data to the opposite input/output port to the output port 329 of the neighbouring switching element.

In transferring data between one switching element and a neighbouring switching element on a diagonal (e.g. NE, SE, SW, or NW), the data passes through four inverters, the first being provided by a tri-stateable inverter 356 between the input port 325 of one switching element and the selected input/output port 303, 305, 307, 309, the second and third being provided by a simple inverter 362 and a tri-stateable inverter 356, respectively, between adjacent orthogonal ports of the intermediate switching element, which effectively turns the data through 90. degree., and the fourth being provided by the simple inverter 364 between the input/output port 303, 305, 307, 309 and the output port 329 of the destination switching element.

In the embodiment of the switching element 301 shown in FIG. 13, a total of 11 (SOSO (bar), REN, REN(bar), UEN, UEN(bar), S1, S2, Den) control signals are required to control all of the switching components. However, the switching element may be implemented such that the control signals required for certain switching components can always be the inverse of that required for other switching components. The number of externally applied control signals can be reduced by providing local inversion. The switching element shown in FIG. 13 can be controlled to assume any configuration required for transferring data between its eight neighbours using just six control signals.

In the implementation shown in FIG. 13, the control signals applied to the 2 to 1 multiplexer 350 of the switches associated with the second and fourth input/output ports 305, 309 can always be the same. Similarly, the control signals applied to the 2 to 1 multiplexers 350 associated with the first and third input/output ports 303, 307 may also always be the same and can always be the inversion of the control signal applied to the other two 2 to 1 multiplexers associated with the second and fourth input/output ports. Thus, only a single external control signal SO is required to control all 2 to 1 multiplexers 350, this single control signal being split locally for the 2 to 1 multiplexers 350 associated with the second and fourth input/output ports 305, 309, and locally inverted and split to control the other two 2 to 1 multiplexers 350 associated with the first and third input/output ports 303, 307 (or vice versa). Therefore, this implementation reduces the number of externally applied control signals by three.

The embodiment of the switching element 301 shown in FIG. 13 is arranged such that the control signal, REN, applied to one of the tri-stateable inverters 356 of the second and fourth switches 313, 317 is always the inversion of the signal applied to the other tri-stateable inverter. Likewise, the switching element 301 may be implemented such that the control signal, UEN, applied to one of the tri-stateable inverters of the first and third switches 311, 315 is always the inversion of that applied to the other tri-stateable inverter. In this way, the control signal for controlling the tri-stateable inverters associated with the second and fourth input/output ports may be inverted locally, and the non-inverted signal applied to one tri-stateable inverter, and the inverted signal applied to the other. This enables the number of required control signals to be reduced by one. Similarly, a single control signal for controlling the tri-stateable inverters 350 associated with the first and third input/output ports may also be inverted locally, and the non-inverted signal applied to one of the these two tri-stateable inverters, and the inverted signal applied to the other. This enables the number of required externally applied control signals to be reduced by a further one, so that the total number of external control signals is reduced by a total of five from eleven to six. The control signals required to configure the switching element 301 to transfer data between one switching element and another in any of the eight possible directions is given in Table 2, of FIG. 15. This table includes a by-pass mode, in which data is transferred locally, for example from the local memory to the local processor element.

Data Transfer Functions

Figure 16:
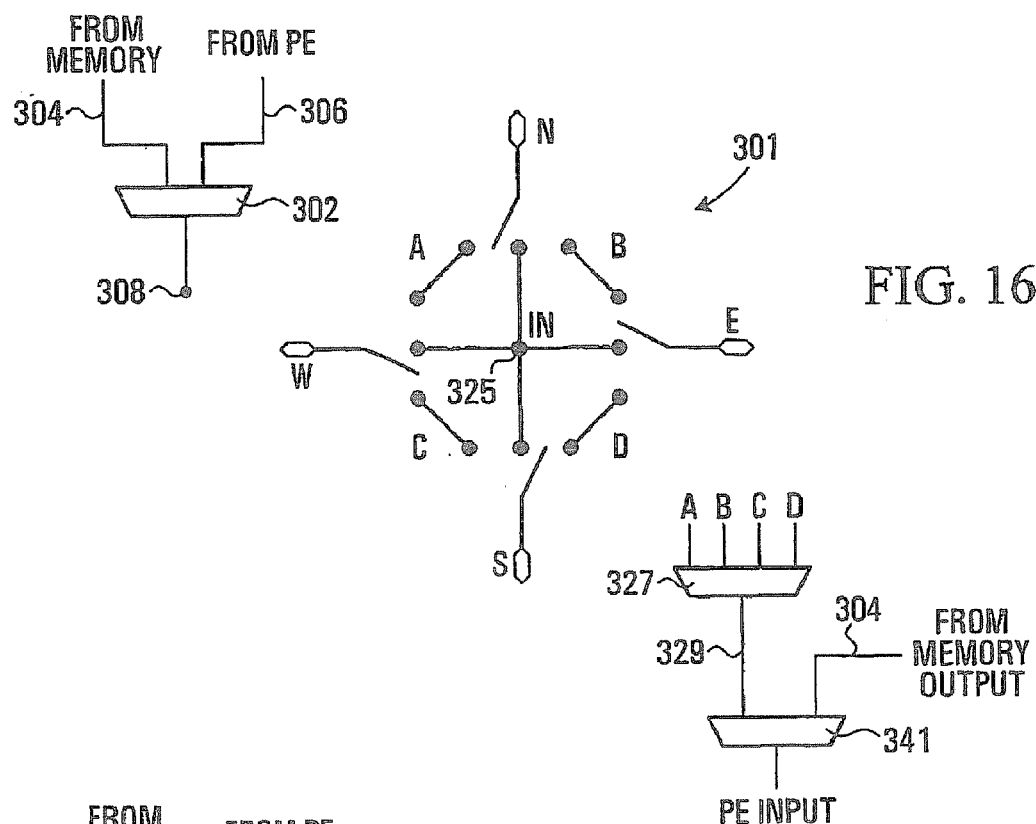
FIG. 16 shows a diagram of a switching element according to another embodiment of the present invention.

Embodiments of the switching element may be arranged for different data transfer capabilities, examples of which will now be described with reference to FIGS. 16 and 17

In one implementation, each switching element may be capable of transferring data from its local memory space to the input of a processing element associated with a neighbouring switching element. Referring to FIG. 16, this implementation is provided by coupling the output of the local memory space to the input port 325, and by coupling the output port 329 to an input of the local processor element. In a second implementation, each switching element may be arranged to permit the transfer of data from a register (or arithmetic logic unit (ALU) output) to the input of a processor element (e.g. register or ALU) associated with a neighbouring switching element. Again, referring to FIG. 16, this functionality may be implemented by coupling the input 325 of each switching element to an output of its local processor element (e.g. register or ALU output), and coupling the output port 329 of the switching element to an input (e.g. register input or ALU input) of its local processor element.

In a third implementation, each switching element may be arranged to enable the transfer of data from a processor element associated with a neighbouring switching element to its local memory. Referring again to FIG. 16, this functionality may be implemented by coupling the input 325 of the switching element to an output (e.g. register or ALU) of its local processor element, and coupling the output 329 of each switching to an input of its local memory.

In a fourth implementation, each switching element may be adapted for transferring data either from its local memory space or from an output from its local processor element (e.g. register or ALU output) to a processor element associated with a neighbouring switching element (i.e. a combination of the first and second implementations described above). Referring again to FIG. 16, this functionality may be implemented by providing a 2 to 1 selector switch (multiplexer) 302 which is switchable between two inputs 304, 306 and coupling the local memory to one of the inputs 304 and an output of the local processor element to the other input 306. The output 308 of the selector switch 302 is coupled to the input 325 of the switching element, and the output 329 of the switching element is connected to an input of its local processor element.

In a fifth implementation, each switching element may be arranged to transfer data from its local memory space to a PE associated with a neighbouring switching element or to transfer data from a PE associated with a neighbouring switching element to its local memory space (which is a combination of the first and third implementations described above). Referring to FIG. 17, this functionality may be implemented by providing a 2 to 1 selector switch 302 having switchable inputs 304, 306, one connected to the local memory and the other connected to an output of the local processor element, as for the embodiment shown in FIG. 16 and connecting the output 308 of the selector switch 302 to the input 325 of the switching element. This arrangement enables data derived locally either from the local memory or local processor element to be transferred out of the switching element to a neighbouring switching element. The output port 329 of the switching element is arranged to be coupleable to an input of its local PE or an input of its local memory. Referring to FIG. 17, the output 329 of the switching element is connected to one of the two input ports of a second 2 to 1 output selector switch 341, the output of which is connected to an input of the local processor element. The other input is connected to the local memory, for example via the input port 325 of the switching element to enable transfer from local memory to local processor element. The output port 329 is also coupled to one of the two inputs of a third 2 to 1 output selector switch 342 whose output is connected to the local memory, to enable incoming data from a neighbouring switching element to be written to the local memory. The second input of the third selector switch 342 is connected to an output of the local processor element to enable data output from the local PE to be transferred directly to the local memory.

Figure 17:
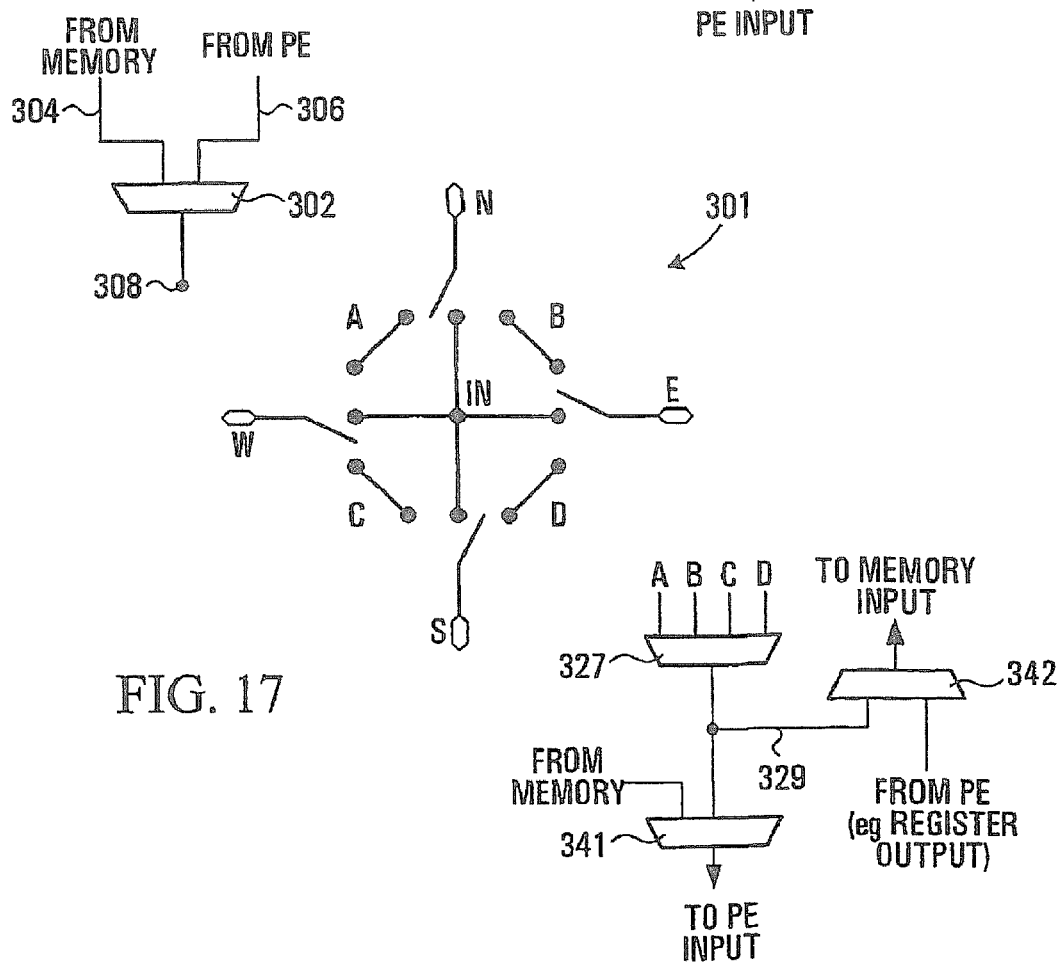
FIG. 17 shows a diagram of a switching element according to another embodiment of the present invention.

It is to be noted that, in addition to providing a read function from a local memory to a processor element of a neighbouring switching element, and a write function from the local memory of a neighbouring switching element to its local memory, the circuit of FIG. 17 also enables the transfer of data between a local processor element and a neighbouring processor element. This functionality may be regarded as a combination of the first, second and third implementations.

In a seventh implementation, each switching element may be arranged for selectively, either transferring data from its local processor element to the processor element of a neighbouring switching element or to transfer data from its local processor element to the memory associated with a neighbouring switching element. Referring again to FIG. 17, this functionality may be implemented by coupling an output of a local processor element (e.g. register or ALU) to the input 325 of the switching element, and selectively coupling the output of the switching element to one of the local processor element and the local memory, which may for example be achieved by the same output circuit arrangement shown in FIG. 17.

Figure 18:
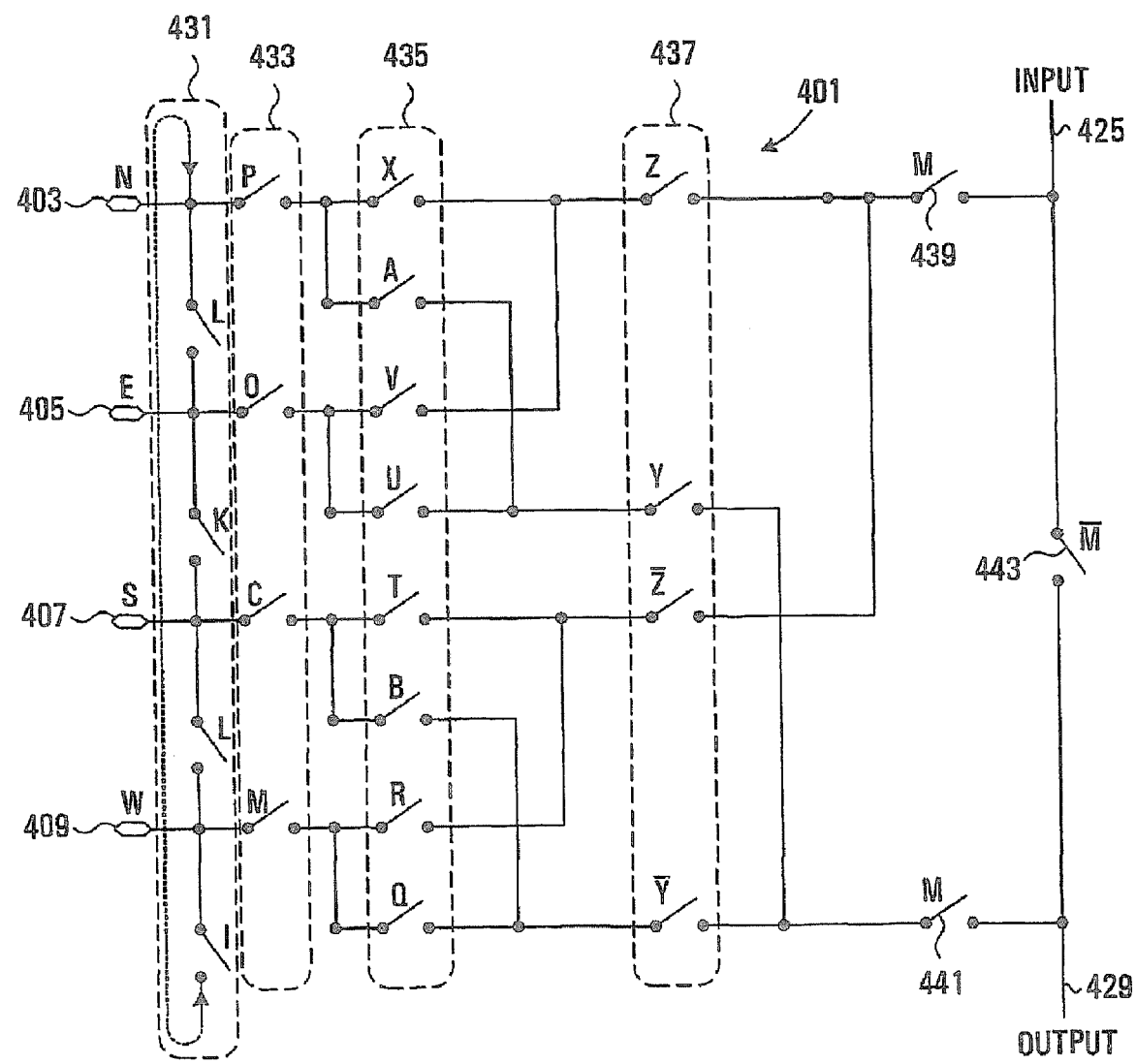
FIG. 18 shows a diagram of a switching element according to another embodiment of the present invention.

FIG. 18 shows another embodiment of a switching element which is capable of transferring data between its nearest eight neighbours, in the row, column and diagonal directions of a two dimensional array. The switching element 401 has first, second, third and fourth input/output ports 403 (N), 405 (E), 407 (S) and 409 (W), each of which may be connected to one port of a similar switching element of its nearest four neighbours. These input/output ports have a similar function to the input/output ports of the embodiments of the switching elements described above. The switching element 401 also includes an input 425, which may for example be coupled to either one or both of a local memory and local processor associated with the switching element, and an output 429, which may be coupled to one or both of a local memory and local processor element associated with the switching element.

The switching element 401 has a first group 431 of four switches L, J, K and I which enable data to be transferred from one input/output port to an adjacent input/output port when the switching element is placed in by-pass mode. The switching element 401 further includes a second group 433 of switches P, O, C and M, a respective one of which is switchable to a respective pair of switches of a third group 435 of switches containing four switch pairs XA, VU, TB and RQ. The first two pairs of switches in the third group, XA and VU determine which of the first and second input/output ports couples to the input 425 and the output 429. Similarly, the third and fourth switch pair of the third group TB, RQ determine which of the third and fourth input/output ports 407, 409 couple to the input port 425 and output port 429. A fourth group 437 of four switches Z, Y, {overscore (Z)} and {overscore (Y)} are connected such that the first switch Z is connected to the terminal of the first switch in each of the first and second switch pairs of the third group of switches X, V, and the second switch Y of the fourth group is connected to the switch terminals of the second switch of the first and second switch pairs A, U. Thus, the first and second switches {overscore (Z)}, {overscore (Y)} of the fourth group 437 together with the first two switch pairs of the third group 435 selectively couple either the first and second input/output ports 403, 405 to either the input port 425 or the output port 429. Similarly, the third switch Z of the fourth group 437 of switches is connected to the terminals of the first switches T, R in each of the third and fourth switch pairs of the third group of switches, and the fourth switch Y of the fourth group is connected to each of the terminals of the second switches B, Q of the third and fourth switch pairs. The third and fourth switches Z, Y of the fourth group, in conjunction with the third and fourth switch pairs of the third group 435 selectively couple the third or fourth input/output port 407, 409 to one of the input and output ports 425, 429. An input access switch 439 is provided between the input 425 and the terminals of the first and third switches Z, {overscore (Z)} of the fourth group to switchably couple the input 425 for an inter-switching element transfer, and an output access switch 441 coupled to the terminals of the second and fourth switches Y, {overscore (Y)} of the fourth group of switches for coupling the output of the switching element for inter-switching element transfer. A local access switch 443 is also provided for direct local access between the input 425 and the output 429, for example to enable direct local transfer between a local memory and a local processor element. It is to be noted that in operation, when the local access switch 443 is closed, both input and output access switches 431, 433 are open, and vice versa.

One of the main differences between this embodiment and the embodiments described previously, is that the input and output 425, 429 are switchably connected through a local access switch 443, which may comprise a toggle switch, instead of a 2 to 1 by-pass multiplexer. A second difference between the switching element structure of FIG. 18 and that of the previously described embodiments, is that the input 425 is coupleable to each of the first, second, third and fourth input/output ports through a branched communication network rather than directly through a switch.

Figure 19:
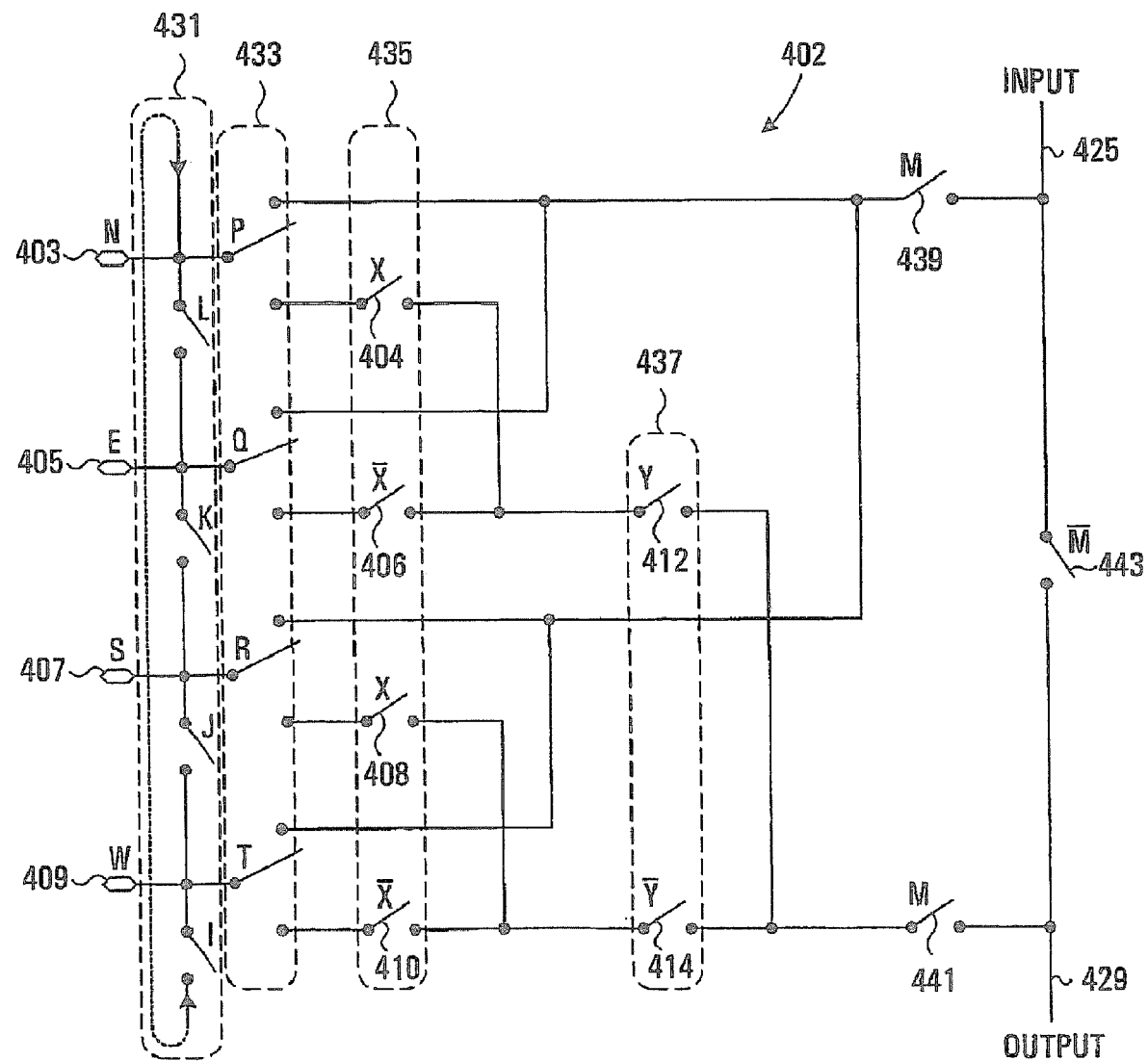
FIG. 19 shows a diagram of a switching element according to another element of the present invention.

FIG. 19 shows a switching element according to another embodiment of the present invention. The switching element 402 is similar to that shown in FIG. 18, and like parts are designated by the same reference numerals. The main differences between this switching element 402 and that shown in FIG. 18 are that the second group 433 of switches P, O, C and M have been replaced by tri-state toggle switches P, Q, R and T, each of which has a first position which connects each of the first, second, fourth input/output ports 403, 405, 409 directly to the input 425 of the switching element via an input access switch 439. Each of the switches is switchable to a second position to place the switching element in one of four modes, in which a selected one of the four input/output ports 403, 405, 407, 409 is coupled to the output port 429. The switching element 402 further includes a third group 435 of switches 404, 406, 408, 410, the first two of which select between the first and second input/output ports 403, 405 and the third and fourth of which select between the third and fourth input/output ports 407, 409. In this embodiment, the second switch is controlled by the inverse control signal applied to the first switch, and the third and fourth switches 408, 410 are controlled by the same control signals as the first and second switches 404, 406, so that the third group of switches has two outputs, one of which is coupled to one of the first and second input/output ports 403, 405 and the other of which is connected to one of the third and fourth input/output ports 407, 409.

The switching element 402 further includes a fourth group 437 of two switches 412, 414, which selectively couple one of the two outputs of the third group of switches to the output port 329 of the switching element via the output access switch 441. In this embodiment, the fourth group 437 of two switches may conveniently controlled by applying a desired control signal to one of the switches and the inverse of the control signal to the other switch.

Returning to FIG. 3, a data processor apparatus according to an embodiment of the present invention, which may comprise a SIMD processor comprises an array of computational units, each having access to an associated local memory segment contained within a memory block. The data processor further includes an array of switching elements, which may comprise any switching elements described above, as well as others, which enables data to be transferred between one computational unit and/or its local memory and another computational unit and its local memory. The array of computational units and the memory block may have any size. However, the size of the memory block may be limited depending on the application of the processor, since the access time for a read or write operation from or to a memory generally increases with memory size. The power drawn by the memory for read and write operations also increases with memory size. Memory access time may also depend on other factors such as the number of I/O ports. Therefore, a memory of a given size will have a minimum access or latency period. Advantageously, embodiments of the present invention provide a data processor apparatus in which the effective memory size may be increased to that required by the particular application, while retaining the desired memory access speeds and reducing power requirements. In one embodiment, this is achieved by selecting a memory block which provides the required memory access speeds and incorporating into the data processor as many memory blocks as necessary to provide the required memory size. An embodiment of a data processor having a plurality of memory blocks is shown in FIG. 20.

Figure 20:
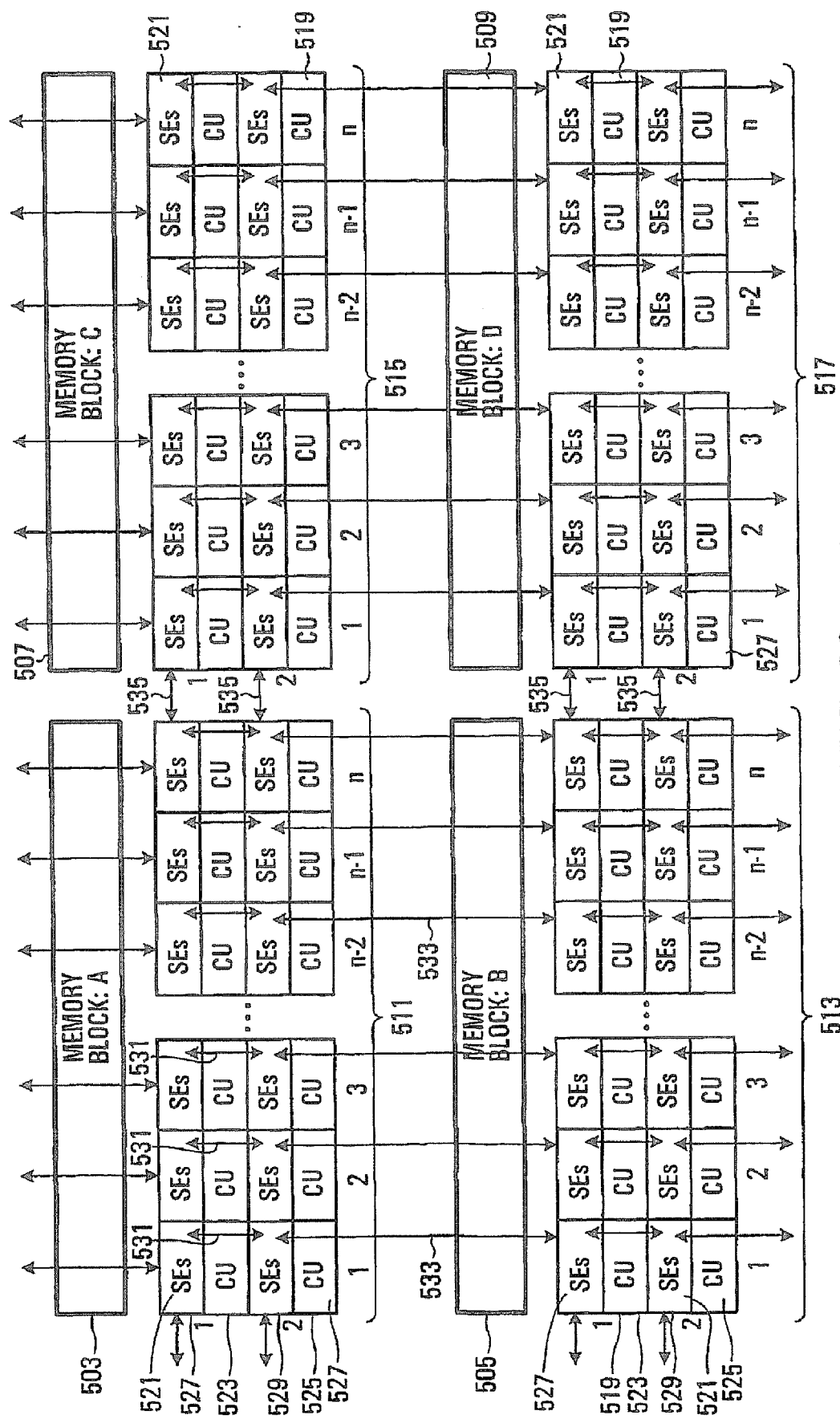
FIG. 20 shows a block diagram of a data processor according to an embodiment of the present invention.

Referring to FIG. 20, the data processor apparatus 501, which may comprise a SIMD processor comprises a first, second, third and fourth memory block 503, 505, 507, 509, each having a respective associated group 511, 513, 515, 517 of computational units 519. Each computational unit comprises one or more processor elements, and may comprise for example 8, 16 or 32 processor elements for performing 8, 16 or 32 bit word processing. Each computational unit has an associated group of switching elements 521 which is arranged to provide data transfer between the computational unit (or its associated memory) and at least one other computational unit (or associated memory). In the present embodiment, the computational units 519 of each group 511, 513, 515, 517 are arranged in a two-dimensional array having two rows 523 (Row 1) and 525 (Row 2) and n columns 527. The groups of switching elements associated with each row of computational units are also arranged in rows 527 (Row 1), 529 (Row 2), and each group of switching elements in each row is connected to its adjacent group(s) of switching elements to provide lateral or east to west, (or west to east) data transfer between their associated computational units contained in each row 523, 525. The two groups of switching elements in each column are also interconnected to provide north to south and south north data transfer between the two computational units in each column, as indicated by the arrows 531.

In this embodiment, the first two-dimensional array of computational units associated with memory block A 503 is effectively expanded from an array containing two rows and n columns into an array containing four rows and 2n columns by adding a second memory block B 505 and second array of associated computational units 513 below the first memory block 503, and adjacent third and fourth memory blocks 507, 509 and associated arrays of computational units 515, 517 to the side. Groups of memory elements in corresponding columns and contained in the second row associated with memory block A and the adjacent first row associated with memory block B are interconnected, as shown by the arrows 533, across memory block B to enable data to be transferred between the second row of computational units or their local memory, associated with memory block A and the first row of computational units or their local memory associated with memory block B.

The groups of switching elements contained in the nth column associated with memory blocks A and B are connected to the groups of switching elements of corresponding rows contained in the first column of the two groups of switching elements associated with memory blocks C and D, as indicated by the arrows 535, to enable data to be transferred between computational units (and/or their associated memory), contained in the nth column associated with memory blocks A and B, and the adjacent first column associated with memory blocks C and D. Thus, a module containing a memory block of the required size and an associated array of computational units may be expanded into an enlarged integrated array, by adding any number of further modules simply by interconnecting the groups of switching elements at the edges of adjacent modules, as shown in FIG. 20.

In designing a module, the size of memory segment per I/O port, and the number of computational units required is generally determined by the application that is to be run on the processor. For example, for MPEG4 decoding, the inventors have determined that four kilobits of memory per I/O port and an array of four by twenty-four eight bit computational units are required. The number of required rows in each memory depends on the column decoder selected. For example, using an eight to one column decoder (or multiplexer), a memory having 512 rows is required to obtain 4 kb per I/O port (8.times.512=4,096 bits, 4 kb).

Having determined the number of rows and the required array size, the number of I/Os in a memory can then be determined.

For example, if the processor runs at 100 MHz, a memory read must be completed in 10 ns. The inventors have found that, after simulation, a memory with 192 I/Os and 512 rows deep has a latency period of 4 ns. Each switching element may have a latency of for example of 1.5 ns, and therefore the latency period of a north to south or east to west transfer, which requires two switching elements, is about 3.0 ns, and the latency period of a diagonal (i.e. NE, SE, SW, NW) read, which requires three switching elements, is about 4.5 ns. Adding the memory latency period of 4 ns to the worst case switching element latency (i.e. a diagonal read), data can be transferred to a neighbouring computational unit with at least 1.5 ns to spare.

Thus, by adopting a processor architecture in which the required size of memory is provided by a plurality of memory blocks, the performance of the processor can be optimized for the application, and at the same time scaled to any size.

A data processor according to another embodiment of the present invention comprises a plurality of processor elements associated with a memory segment. In one embodiment, each processor element is coupled to the same memory port (for at least one of read and write memory access). An input port of each processor element may be coupled to a common read line, which is coupled to a memory output port and/or an output port of each processor element may be coupled to a common write line, which is coupled to a memory input port, which may be associated with the same or different memory segment as the input port. The common read access line and/or the common write line to which the processor elements are connected, may be coupled to a respective memory input and output port through a switching element, which enables other processor elements associated with one or more different memory segments accessed to one or more of the processor elements and their associated memory segments.

The data processor may include at least one register for each processor element, each coupled to a common read access line, each of which may be selectively enabled to receive data from the common access line in order to control which processor element has access to the memory segment at any one time. The input registers may be controlled in conjunction with the memory decoders such that either the same or different data from the memory is read into different processor elements. An embodiment of a data processor having multiple processor elements associated with a memory segment is shown in FIG. 21.

Figure 21:
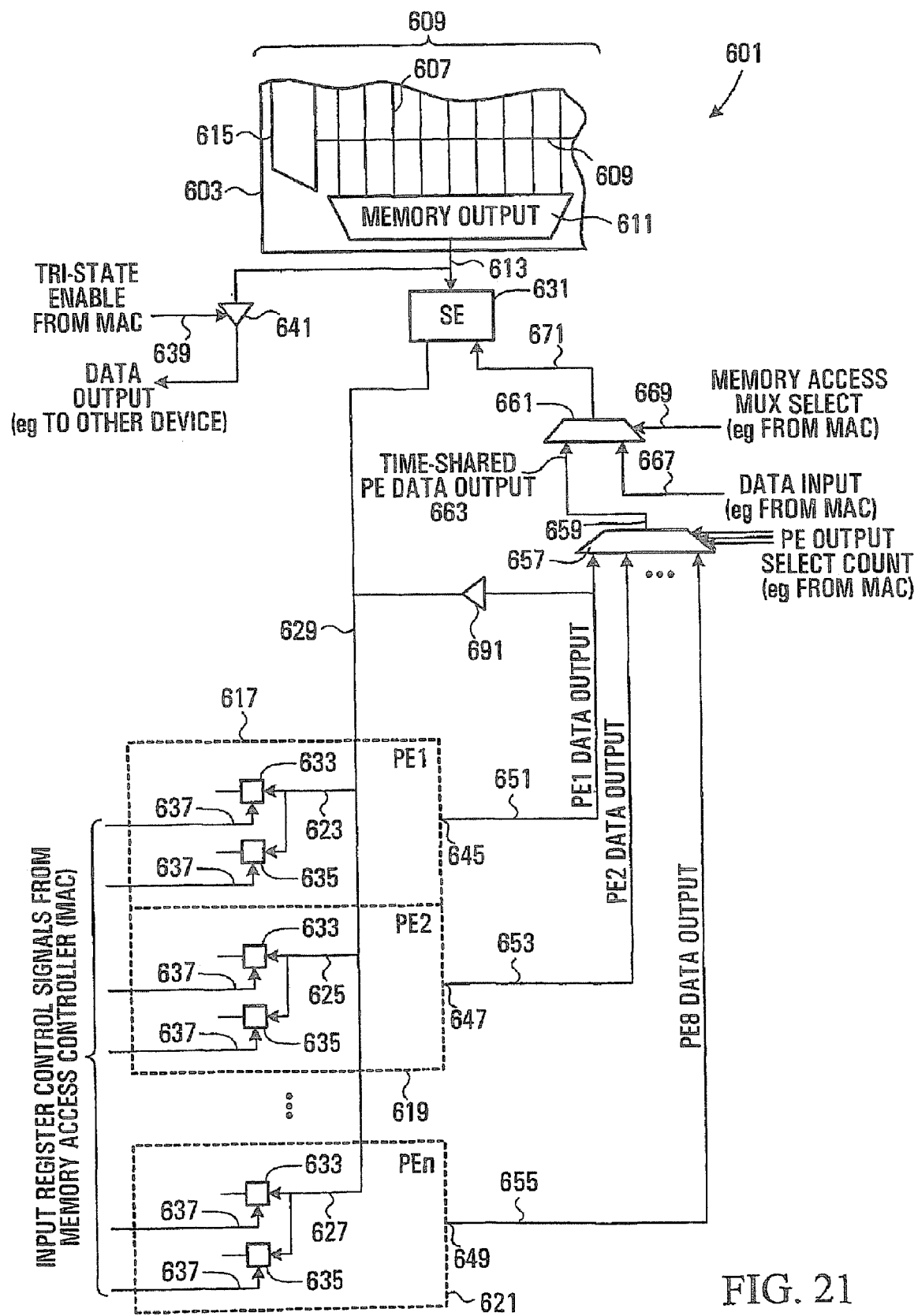
FIG. 21 shows a diagram of a data processor according to another embodiment of the present invention.

Referring to FIG. 21, a data processor 601 comprises a memory 603 (for example a RAM) having a plurality of columns 607 of storage elements. The memory may have a plurality of segments 609 (only one of which is shown in FIG. 21), each segment having a plurality of columns of storage elements connected to a column decoder 611, which has a memory port 613 (e.g. an I/O port, which may include separate terminals for read and write access or a common read/access terminal). The memory 603 also includes a row decoder 615 for selecting a row of storage elements for read and/or write access. The data processor 601 comprises a plurality of processor elements 617, 619, 621 each having an input port 623, 625, 627 coupled to a common read access line 629, which is coupled to the memory port 613 via an optional switching element 631 which may be switchable to couple either the local read access line 629 to the local memory port 613, or to connect one or more other processor elements and/or their associated memory segments to the local memory segment 609 or to the local processor elements 617, 619, 621.

Each processor element 617, 619, 621 has at least one and in the present embodiment two input registers 633, 635 coupled to a respective processor input port 623, 625, 627 for temporarily storing data output from the memory before being processed by the respective processor element. Data write access to each register to enable or disable each register from receiving data on the common read access line 629 is controlled by a control signal applied to a control input port 637. Each register is individually controllable by a control signal. The control signals may be applied by any suitable device, for example a memory access controller (MAC, not shown). Although in another embodiment, simple switches may be used to selectively couple the input port of each processor element to the common read line, the provision of one or more registers enables a processor element to operate on the data contained in its register(s), while another processor element performs a memory access and data is downloaded into its register(s). The provision of two or more registers for one or more processor elements enables the or each processor elements to process data stored in one register and at the same time make a memory access so that data from the memory is downloaded into the second register (or one of its other registers, if the processor element has more than two registers) so that data to be processed is pre-fetched. In this way, each register of a PE may be alternately selected for (1) receiving data from the memory and (2) for outputting data to be processed by the PE, for example to its ALU.

In the present embodiment, the memory port 613 is switchably coupled to another line 639 via a switch 641, which may for example comprise a tri-stateable inverter, and may be controlled by any suitable device, e.g. the same or different device used to control the registers 633, 635. Advantageously, this arrangement enables the memory segment to be accessed by another device, such as a data processor. The provision of one or more registers 633, 635 coupled to the input port of each processor element enables the processor elements to process data from the memory, while the memory is being accessed by another device, via the other read access line 639.

The process or architecture of the embodiment of FIG. 21 offers a designer a wide range of possible operating modes. For example, the present configuration allows a page mode memory access. In page mode, a single row of memory (or segment of memory) is selected, and columns within the same memory segment are then successively selected by the column decoder (column access storage (CAS) signal), while the row access strobe (RAS) signal remains active. As each data bit appears on the common read line 629, the input registers of the processor elements may be successively activated so that for example a bit from each successive memory column is written to a register of successive processor elements. In one example, a byte of data may be stored in a row of storage elements, and the data processor may include eight or more processor elements. Different bits of the byte may be read into different processor elements, and the processor elements may be arranged to perform a parallel operation on the byte word. A second byte, for example from a second row of storage elements may also be read from the memory, for example using page mode, and different bits of the second byte also read into different processor elements, which may then perform an operation on both bytes, for example by making a comparison calculation, or any other operation.

In this embodiment, each memory segment includes one or more columns of storage elements, and may include any number of processor elements, for example 2, 4, 16, 32, or any other number.

Returning to FIG. 21, the data processor 601 also includes circuitry to enable each processor to output data to its local memory, or optionally, another memory segment or another processor element, associated with that memory segment, through the switching element 631.

Each switching element 617, 619, 621 has an output port 645, 647, 649 each coupled to a respective output line 651, 653, 655. The output port of each processor element may be coupled to, for example, the output of an ALU, a register (e.g. internal register) or another element of the processor element, or may be coupleable to any one of these. The output circuit further includes a first output selector switch 657 coupled to each of the output lines 651, 653, 655, which switchably connects one of the output lines to the output port 659 of the selector switch 657. The output 659 of the selector switch 657 may be coupled to the switching element (SE) 631, which may be arranged to enable data from the processor elements to be written into their local memory 609, or into one or more other parts of the memory or into one or more other processor elements. Alternatively, the output of the first selector switch 657 may be coupled directly to the local memory input port (or to another memory input port). In the present embodiment, a second selector switch 661 is provided having two inputs 663, 665, one of which 663 is coupled to the output port 659 of the first selector switch 657, and the other being connected to another line 667 which may be used to receive data from another device. The second selector switch 661 is controlled by appropriate control signals applied (by any device, e.g. the array controller) to its control input port 669 for connecting one of its input ports to its output port 671. The output port of the second selector switch 661 may be connected to the switching element 631, or directly to the memory input port 613. (Alternatively, the output 671 port may be connected to any other component, for example, of the data processor, such as a memory segment of the same or different memory, or a different processor or other device.

Figure 22:
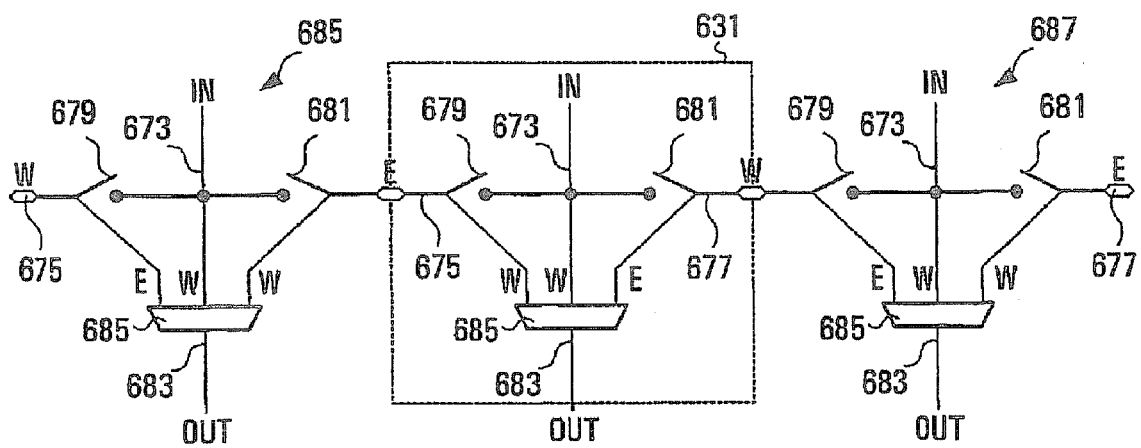
FIG. 22 shows a diagram of a switching element according to an embodiment of the present invention.

An embodiment of a switching element which may be implemented as the switching element 631 in the embodiment of FIG. 21 is shown in FIG. 22. The switching element 631 has an input port 673, first and second input/output ports 675, 677 which is switchably coupled to the input port 673 by a respective first and second switch 679, 681, and an output port 683 which is switchably coupled to the input port 673, and the first and second input/output ports 675, 677 via a selector switch 685. The input port may be coupled to the local memory port (613 in FIG. 21), to one or more outputs of the processor elements (e.g. to one or more of the output lines 651, 653, 655 in FIG. 21, for example via the first or second selector switches 657, 661 in FIG. 21), or may be selectively coupled to either of the local memory or the output from one or more processor elements.

The output port 683 of the switching element may be coupled to the input port of one or more processor elements, and may, for example, be coupled to the common read access line 629 in FIG. 21 or may be coupled to the local memory input port (for example memory ports 613 in FIG. 21), or switchable coupled to either.

A series of switching elements, for example switching elements 631, 685, 687 may be coupled together to enable the lateral transfer of data from one unit, comprising, for example a memory segment and a plurality of local processor elements, associated with one switching element, and another unit associated with another switching element.

The combination of switching elements which allows east to west and west to east data transfer in the east to west and west to east directions, and the interconnected processor elements associated with each switching element enables data to be transferred between a processor element (or its associated memory) and any one of its eight neighbours (processor elements or their local memory) (or more remotely) in the north to south, south to north direction, the east to west and west to east directions and both diagonal directions (i.e. Northeast to Southwest and vice versa and Northwest to Southeast directions and vice versa).

Figure 23:
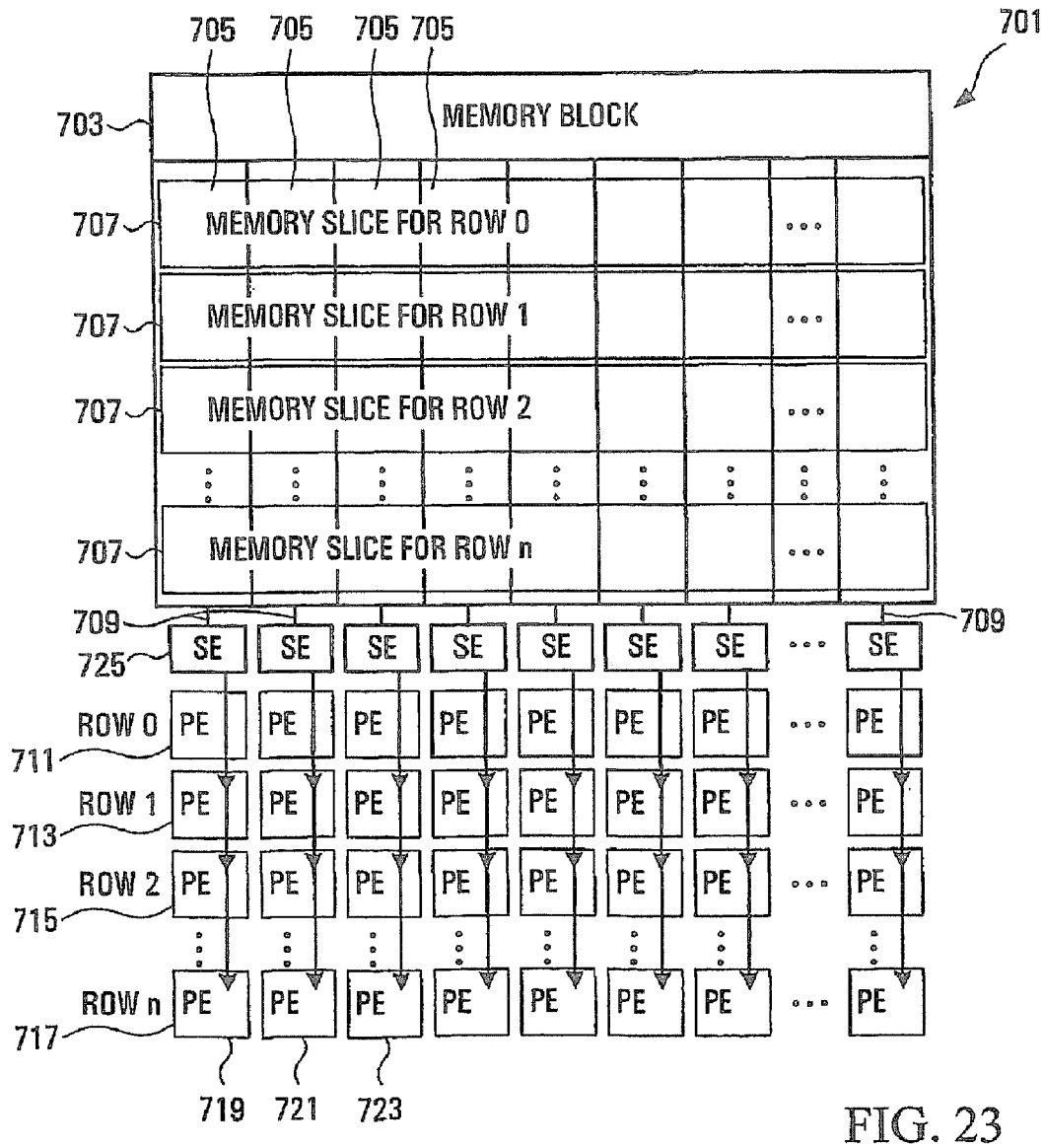
FIG. 23 shows a block diagram of a data processor according to another embodiment of the present invention.

Another embodiment of a data processor having an architecture comprising a plurality of units, each having a memory segment and a plurality of processor elements associated with a memory segment, is shown in FIG. 23. The data processor 701 comprises a memory 703 having a plurality of column segments 705 which are divided into a plurality of row segments 707. Each column segment has an associated memory port 709 to enable data to be at least one of read from and written to the memory segment. The data processor further includes a plurality of processor elements 711, 713, 715, 717 associated with each column segment 705 of the memory, and which in this embodiment are arranged in column groups 719, 721, 723 etc., although processor elements associated with a particular memory segment may be arranged in any other configuration. Each group 719, 721, 723 of associated processor elements are interconnected to a common read line and/or to a common output line, for example as for the embodiment of FIG. 21. Each group of processor elements is coupled to the memory port of its respective memory segment by a switching element 725, which may for example be similar to the embodiment of the switching element shown in FIG. 22. In one embodiment, the switching elements may be interconnected to enable the transfer of data between neighbouring groups of processor elements and their associated memory segments, in applications where the data processor is required to operate on single bit data. However, in the present embodiment, adjacent switching elements are not interconnected, but are provided for another interconnection scheme which allows multiple bit words to be transferred between different elements of the data processor, as will be described below.

In the present embodiment, each row (0 to n) of processor elements has a corresponding row segment or slice (0 to n) of memory. In operation, each row of processor elements may be arranged to read data from its corresponding memory slice one at a time and in any order. For example, the processing elements in row 0 may first be enabled to read from their row 0 memory slice, then the processor elements in row 1 may be enabled to access their corresponding row 1 memory slice, (for example in the next cycle), until all required rows of processor elements have accessed their corresponding row memory slice. Successive memory accesses by successive rows of processor elements may be referred to as pipelined accesses. In processing the data, a row of processing elements may begin processing the data once the data is received, or wait until one or more other rows of processing elements have also received data to be processed. In either case, data may be processed by each row of processing elements at different times (i.e. in different cycles) or simultaneously in the same cycle or cycles.

The embodiments of the data processor shown in FIGS. 21 and 23 allow multiple processing elements to access the memory via a single switching element. This arrangement may improve the timing for transferring data from a given memory space to a number of processor elements since the latency period is that associated with a single switching element, rather than multiple switching elements. This arrangement also reduces the time required for inter-processing element data transfer between associated processor elements (for example in the same column), since the data can be transferred from any processor element to any other associated processor element through a single switching element, in other words, by a left or right shift North/South except does not require a switching element. In one embodiment, the output port or line of one or more processor elements may be switchably connected to the input port of any other processor element by by-passing the switch as shown for example by the switch 691 between the output line 651 of the first processing element and the common read line 629 of the embodiment shown in FIG. 21. The output or line of other processor elements may be similarly connected to the common read access line 629.

In one embodiment, each row of processor elements may be arranged to perform parallel processing on multiple bit data, for example byte wide data or multiple byte wide data (e.g. containing 16, 32, 64 etc. bits). The processor elements may be arranged in groups of eight, thereby forming a computational unit capable of performing processing operations on byte length data. To enable data bytes to be transferred between one computational unit and another, each switching element 725 of the embodiment shown in FIG. 23 is connected to a corresponding switching element of a neighbouring computational unit (either to the right or to the left or both) to enable bits of the same significance to be transferred between computational units.

In other embodiments, the computational units may have any number of processor elements to enable the computational units to process data of any length, for example 16 bit data, 24 bit data, 32 bit data etc. In another embodiment, two or more computational units may be coupled together to enable variable length word processing. In this case, a switching element may be switchably connected to two or more other switching elements for transferring bits of the same significance in a data transfer, depending on the length of the word. For example, corresponding switching elements of neighbouring eight bit computational units may be interconnected to enable the transfer of data bytes between neighbouring computational units. Each switching element of a computational unit may also be switchably connected to an eight bit computational unit immediately adjacent its neighbouring computational unit to enable 16 bit data transfers between pairs of computational units acting together as a 16 bit parallel processor. This arrangement may be extended to enable data transfers between computational units of words of any desired length.

Figure 24:
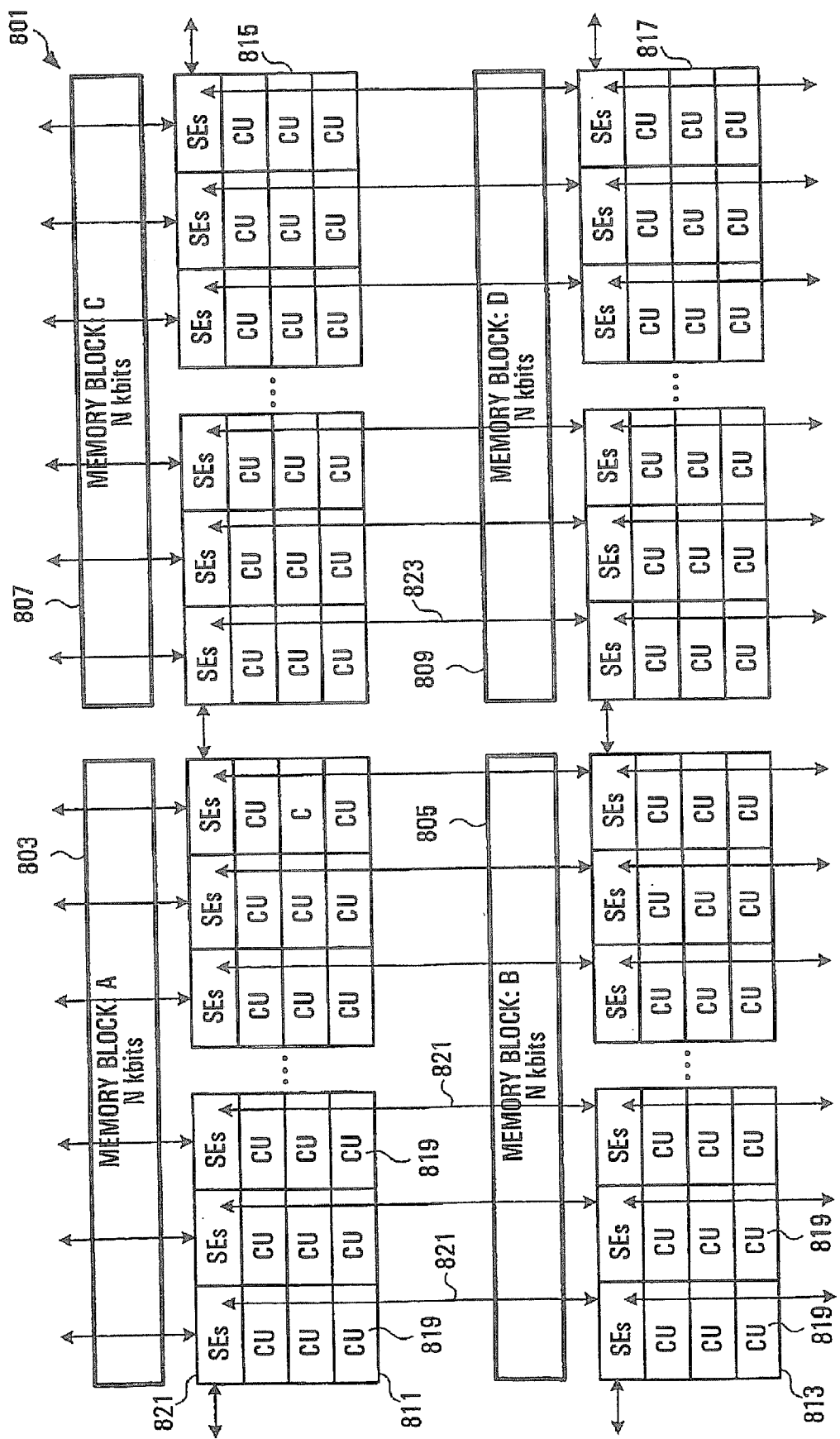
FIG. 24 shows a data processor according to another embodiment of the present invention.

The processing capacity of the data processor described above and shown in FIG. 23 may be expanded to any desired size, by for example adding and interconnecting further blocks of memory and associated computational units. An example of a data processor containing four interconnected memory blocks and associated computational units is shown in FIG. 24. Referring to FIG. 24, the data processor 801 has four memory blocks 803, 805, 807, 809 each having an associated array of computational units 811, 813, 815, 817. Each computational unit may comprise one or more processor elements, for example eight processor elements for byte length word processing. The computational units are arranged in two-dimensional arrays of rows and columns. Each column 819 of computational units has an associated switching element (if each computational unit has only one processor element) or group of switching elements (if each computational unit has more than one processor element) 821. The switching element or group of switching elements 821 are arranged in rows, adjacent switching elements or groups of switching elements being coupled to the or each neighbouring switching element or group of switching elements to enable data to be transferred laterally between computational units in different (e.g. neighbouring) columns. The switching element or groups of switching elements in corresponding columns of the first and second array of computational units 811, 813 are also connected to allow data to be transferred between computational units and/or their associated memory space of the first and second units, as indicated by the arrow 821, and the switching element or group of switching elements of corresponding columns of computational unit associated with the third and fourth array of computational units 815, 817 are also interconnected as shown by the arrows 823, to allow data to be transferred between the third and fourth units.

Although in the embodiment of FIG. 23, a single memory block may be used to serve all of the arrays of computational units, it may be preferable to provide a number of smaller, separate memory blocks to give the required memory space in order to reduce memory access times and to provide other advantages as described in connection with the embodiments shown in FIG. 20.

Embodiments of the data processor apparatus may be formed on a single die using any integrated circuit fabrication technique. Embodiments of the data processor apparatus are particularly applicable to SIMD processor operation and allows one or two-dimensional arrays of data of any size to be processed and parallel.

In other embodiments of the present invention, any one or more elements described above in connection with one embodiment may be incorporated in any other embodiment or combined with any other element or component.

Although a several embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow. The scope of the disclosure is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A data processor apparatus, comprising:

a plurality of processor elements including a first processor element, a second processor element, and a third processor element;

a memory having a plurality of parts, each memory part being associated with said respective processor element; and a first switching element associated with said first processor element for switchably coupling said first processor element to its associated memory part for at least one of read and write access, and wherein said first switching element has an input port for access to at least one of said associated memory part and said first processor element, an output port for access to at least one of said associated memory part and said first processor element, a first port being coupled to an input/output port of a second switching element, the second switching element being associated with said second processor element for switchably coupling said second processor element to its associated memory part, a second port being coupled to an input/output port of a third switching element, the third switching element being associated with said third processor element for switchably coupling said third processor element to its associated memory part, a first switch means for selectively coupling said first port to one of said input port and said output port, and a second switch means for selectively coupling said second port to one of said input port and said output port.

2. A data processor apparatus as claimed in claim 1, wherein each of said memory parts comprises a single column of memory elements.

3. A data processor apparatus as claimed in claim 1, wherein each memory part contains at least one column of storage elements, each memory part having a memory port, at least one memory part has a plurality of respective processor elements associated therewith, each coupled to said switching element for at least one of read and write access to said memory part through said memory port.

4. A data processor apparatus as claimed in claim 3, wherein each of the respective processor elements associated with said memory part comprises an input register for coupling to said memory port.

* * * * *